(12) United States Patent
Kim et al.

(10) Patent No.: US 11,470,556 B2
(45) Date of Patent: Oct. 11, 2022

(54) APPARATUS AND METHOD FOR REDUCING POWER CONSUMPTION OF RECEIVING DATA IN WIRELESS COMMUNICATION SYSTEM

(71) Applicant: SAMSUNG ELECTRONICS CO., LTD., Suwon-si (KR)

(72) Inventors: Jinho Kim, Seoul (KR); Jungmin Park, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/204,038

(22) Filed: Mar. 17, 2021

(65) Prior Publication Data

US 2021/0400587 A1  Dec. 23, 2021

(30) Foreign Application Priority Data

Jun. 17, 2020 (KR) .......................... 10-2020-0073729

(51) Int. Cl.
*H04W 52/02* (2009.01)
*H04W 16/02* (2009.01)

(52) U.S. Cl.
CPC ....... *H04W 52/0241* (2013.01); *H04W 16/02* (2013.01); *H04W 52/0229* (2013.01)

(58) Field of Classification Search
CPC ............. H04W 52/0241; H04W 16/02; H04W 52/0229
USPC ........ 370/311, 328, 329, 338, 341, 345, 350
See application file for complete search history.

(56) References Cited

U.S. PATENT DOCUMENTS

| | | | |
|---|---|---|---|
| 7,778,216 B2 | 8/2010 | Cho | |
| 8,194,558 B2 | 6/2012 | Choi et al. | |
| 8,259,618 B2 | 9/2012 | Jeon et al. | |
| 9,014,153 B2 | 4/2015 | Park et al. | |
| 9,374,259 B2 | 6/2016 | Tabet et al. | |
| 9,907,116 B2 | 2/2018 | Coersmeier | |
| 10,051,616 B2 | 8/2018 | Song et al. | |
| 10,243,697 B2 | 3/2019 | Kim et al. | |
| 2016/0014697 A1 | 1/2016 | Mujtaba et al. | |
| 2018/0255572 A1* | 9/2018 | Harada | H04W 72/04 |
| 2019/0089486 A1 | 3/2019 | Kim et al. | |
| 2019/0098649 A1* | 3/2019 | Baghel | H04W 72/1257 |
| 2019/0124693 A1 | 4/2019 | Nguyen et al. | |
| 2019/0149311 A1* | 5/2019 | Takeda | H04W 24/10 370/329 |
| 2019/0296847 A1 | 9/2019 | Sun et al. | |
| 2020/0221434 A1* | 7/2020 | Sun | H04W 74/006 |

OTHER PUBLICATIONS

US 10,039,056 B2, 07/2018, Kim et al. (withdrawn)

* cited by examiner

*Primary Examiner* — Nghi H Ly
(74) *Attorney, Agent, or Firm* — Sughrue Mion, PLLC

(57) ABSTRACT

A wireless communication method of a receiver, including performing a first determination of whether to decode a control channel of a current time transmission interval (TTI) based on control channel information of a previous TTI; decoding the control channel of the current TTI based on a result of the first determination; performing a second determination of whether a data channel is included in the current TTI based on a result of the decoding; and performing a third determination of whether to deactivate a communication interface configured to process a received signal based on a result of the second determination.

20 Claims, 11 Drawing Sheets

APPARATUS AND METHOD FOR REDUCING POWER CONSUMPTION OF RECEIVING DATA IN WIRELESS COMMUNICATION SYSTEM

CROSS-REFERENCE TO RELATED APPLICATION

This application is based on and claims priority under 35 U.S.C. § 119 to Korean Patent Application No. 10-2020-0073729, filed on Jun. 17, 2020, in the Korean Intellectual Property Office, the disclosure of which is incorporated by reference herein in its entirety.

BACKGROUND

1. Field

The disclosure relates to an apparatus and method for reducing power consumption of receiving data in wireless communication system.

2. Description of Related Art

In order to meet the increasing demand for wireless data traffic since the commercialization of 4th generation (4G) communication systems, efforts have been made to develop an improved 5G communication system, and accordingly, a 5G communication system has recently been commercialized.

Consideration is being given to implementing the 5G communication system in millimeter wave (mmW) frequency bands (e.g., 60 GHz bands) to accomplish higher data rates. In order to mitigate propagation loss and increase the propagation distance, discussions are underway about various techniques, such as beamforming, massive multiple-input multiple output (MIMO), full dimensional MIMO (FD-MIMO), array antenna, analog beamforming, and large-scale antenna in the 5G communication system.

Also, in order to enhance the network performance of the 5G communication system, developments are underway about various techniques, such as evolved small cell, advanced small cell, cloud radio access network (RAN), ultra-dense network, device-to-device (D2D) communication, wireless backhaul, moving network, cooperative communication, coordinated multi-points (CoMP), and interference cancellation.

Furthermore, the ongoing research includes the use of hybrid frequency shift keying and quadrature amplitude modulation (FQAM) and sliding window superposition coding (SWSC) as advanced coding modulation (ACM), and filter bank multi-carrier (FBMC), non-orthogonal multiple access (NOMA), and sparse code multiple access (SCMA) as advanced access techniques.

As a result of the commercialization of 5G following 4G, the data rate supported by a wireless communication system has rapidly increased, and high-definition/large-capacity multimedia services may be supported by a wireless communication terminal. Accordingly, the power efficiency of the wireless communication device has become more important.

In such a wireless communication system, in order for a terminal to successfully receive data transmitted from a base station or another terminal, accurate information about a wireless channel between a transmitter, for example a base station or a terminal, and a receiver. for example another terminal may be beneficial. Furthermore, in order to estimate the wireless channel, the transmitter transmits a predefined reference signal, and the receiver estimates the wireless channel based on the received reference signal. For example, in the 4G and 5G communication systems, the reference signal for data reception, for example a Cell-Specific Reference Signal (CRS) in 4G, Demodulation Reference Signal (DRS) in 5G, may be transmitted from the transmitter to the receiver every transmission time interval (TTI), for example a sub-frame of 4G or slot of 5G.

As described above, the wireless communication system may perform reference signal-based wireless channel estimation for data reception. The reference signal for channel estimation is transmitted every time unit, for example every TTI, and the terminal may perform channel estimation every time unit in order to optimize reception performance. However, when a wireless channel characteristic hardly changes for a certain period of time, for example when the coherence time for which the wireless channel characteristic is maintained is long, it may be a waste of power for the terminal to perform a channel estimation operation every time unit.

In addition, in a case where data is transmitted sparsely, such as voice over Long-Term Evolution (LTE) (VoLTE), a control channel may be continuously monitored to check whether data has been transmitted. In this case, there may be a problem in that the power required to continuously monitor the control channel occupies a significant portion of the total power consumption of the terminal.

SUMMARY

Provided are an apparatus and method for efficiently reducing power consumption when a wireless communication system receives data.

Additional aspects will be set forth in part in the description which follows and, in part, will be apparent from the description, or may be learned by practice of the presented embodiments.

In accordance with an aspect of the disclosure, a wireless communication method of a receiver includes performing a first determination of whether to decode a control channel of a current transmission time interval (TTI) based on control channel information of a previous TTI; decoding the control channel of the current TTI based on a result of the first determination; performing a second determination of whether a data channel is included in the current TTI based on a result of the decoding; and performing a third determination of whether to deactivate a communication interface configured to process a received signal based on a result of the second determination.

In accordance with an aspect of the disclosure, a receiver includes a communication interface configured to process a signal received from a transmitter; and a controller configured to control the communication interface, wherein the controller is further configured to: control the communication interface to decode a control channel of a current transmission time interval (TTI) after determining whether to decode the control channel of the current TTI based on control channel information of a previous TTI; and determine whether to deactivate the communication interface after determining whether a data channel is included in the current TTI based on a decoding result.

BRIEF DESCRIPTION OF THE DRAWINGS

The above and other aspects, features, and advantages of certain embodiments of the present disclosure will be more clearly understood from the following detailed description taken in conjunction with the accompanying drawings in which.

DETAILED DESCRIPTION OF THE EMBODIMENTS

Figure 1:
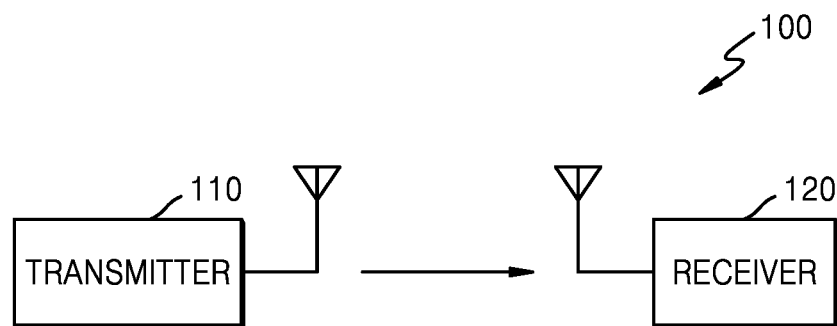
FIG. 1 is a diagram illustrating a wireless communication system according to an embodiment.

Hereinafter, embodiments will be described in detail with reference to the accompanying drawings.

Advantages and features and methods to achieve the same are described more fully hereinafter with reference to the accompanying drawings in which embodiments are shown. The disclosure may, however, be embodied in many different forms and should not be construed as limited to the embodiments set forth herein. Rather, these embodiments are provided so that this disclosure is thorough, and will fully convey the scope to those skilled in the art. Specific configurations described only in each embodiment may be used in other embodiments. Like reference numerals refer to like components throughout the present specification.

Terms used herein are for describing the embodiments and are not intended to limit the disclosure. In the present specification, a singular expression includes a plural expression unless the context clearly indicates otherwise. It will be further understood that the terms "comprises" and/or "comprising", when used in this specification, specify the presence of stated features, steps, operations and/or components do not preclude the presence or addition of one or more features, steps, operations and/or components.

Unless otherwise defined, all terms including technical and scientific terms used herein have the same meaning as commonly understood by one of ordinary skill in the art to which the disclosure pertains. Terms, such as those defined in commonly used dictionaries, are not to be construed in an idealized or overly formal sense unless expressly so defined herein.

In describing embodiments in detail, although the embodiments may relate to a new radio (NR) system and a long term evolution (LTE)/LTE-advanced (LTE-A) system, it is to be understood that the subject matter to be claimed herein may be applied to other communication systems having similar technical backgrounds as well as other communication systems using licensed and unlicensed bands without departing from the scope of the disclosure herein, and this will be possible at the discretion of the person skilled in the art.

Before undertaking the detailed description below, it may be advantageous to set forth definitions of certain words and phrases used throughout this patent document. The term "connect or couple" and its derivatives refer to any direct or indirect communication between two or more components, whether or not those components are in physical contact with one another. The term "transmit," "receive," and "communicate," as well as derivatives thereof, encompass both direct and indirect communication. The term "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below may be implemented or supported by one or more computer programs, each of which is formed from computer-readable program code and embodied in a computer-readable recording medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable recording medium" includes any type of medium capable of being accessed by a computer, such as read only memory (ROM), random access memory (RAM), a hard disk drive, a compact disc (CD), a digital video disc (DVD), or any other type of memory. A "non-transitory" computer-readable recording medium excludes wired, wireless, optical, or other communication links that transport transitory electrical or other signals. A non-transitory computer-readable recording medium includes media where data may be permanently stored and media where data may be stored and later overwritten, such as a rewritable optical disc or an erasable memory device.

Hereinafter, various embodiments of the disclosure will be described based on an approach of hardware. However, various embodiments of the disclosure include a technology that uses both hardware and software and thus, the various embodiments of the disclosure may not exclude the perspective of software.

In addition, terms referring to control information, terms referring to an entry, terms referring to network entities, terms referring to messages, terms referring to components of devices, etc. are used for convenience of explanation. Accordingly, the disclosure is not limited to terms to be described later, and other terms having an equivalent technical meaning may be used.

FIG. 1 is a diagram illustrating a wireless communication system 100 according to an embodiment.

Referring to FIG. 1, the wireless communication system 100 may include a transmitter 110 and a receiver 120.

For reference, although the transmitter 110 and the receiver 120 are depicted as separate entities in FIG. 1, the transmitter 110 and the receiver 120 may include transmitting and receiving ends capable of performing both transmission and reception operations, respectively. In addition, in FIG. 1, the wireless communication system 100 is depicted as including only one transmitter 110 and one receiver 120, but in embodiments the wireless communication system 100 may include transmitters and receivers.

The transmitter 110 and the receiver 120 of FIG. 1 refer to devices capable of transmitting or receiving signals over a wireless network.

Specifically, the transmitter 110 and the receiver 120 may be referred to by terms such as a mobile station, user equipment, a subscriber station, a user terminal, a remote terminal, and a wireless terminal. In addition, the transmitter 110 and the receiver 120 may be referred to by terms such as a base station, an evolved Node B (eNB), a next generation Node B (gNB), and an access point (AP). Further, each of the transmitter 110 and the receiver 120 may be a mobile device such as a mobile phone or a smart phone, or a stationary device such as a desktop computer.

In embodiments, a protocol applied to the wireless communication system 100 of FIG. 1 may include cellular communication such as LTE (long term evolution), LTE-A (LTE-Advanced), NR (New Radio), WiBro (Wireless Broadband), and GSM (Global System for Mobile Communication), and may include short-range communication such as Wireless Fidelity (WiFi), Bluetooth, and Near Field Communication (NFC).

In addition, the transmitter 110 and the receiver 120 of FIG. 1 may transmit or receive signals using an orthogonal frequency division multiplexing (OFDM) scheme in a multiplexing scheme. In addition, the transmitter 110 and the receiver 120 may transmit or receive signals using code division multiple access (CDMA), frequency division multiple access (FDMA), or time division multiple access (TDMA).

In addition, the transmitter 110 and the receiver 120 of FIG. 1 may include a single antenna or a plurality of antennas, and accordingly, transmission or reception techniques such as multiple-input multiple-output (MIMO), multiple-input single-output (MISO), single-input multiple-output (SIMO), or single-input single-output (SISO) may be applied.

In addition, the wireless channel of FIG. 1 is a path through which signals are transmitted or received. In the wireless channel, signals may be scattered, reflected, and refracted by a scatterer, reflector, etc. and delayed in a time domain or transmitted through multiple paths. Due to the Doppler effect caused by the movement of the transmitter 110 or the receiver 120, a Doppler shift phenomenon in which the frequency of the signal received by the receiver 120 is different from the frequency of the signal transmitted by the transmitter 110 may occur. Also, a channel that rapidly changes over time as described above may be referred to as a fast fading channel.

For reference, various embodiments provide a method of selectively performing channel estimation on a channel that changes rapidly or does not change over time.

Figure 2:
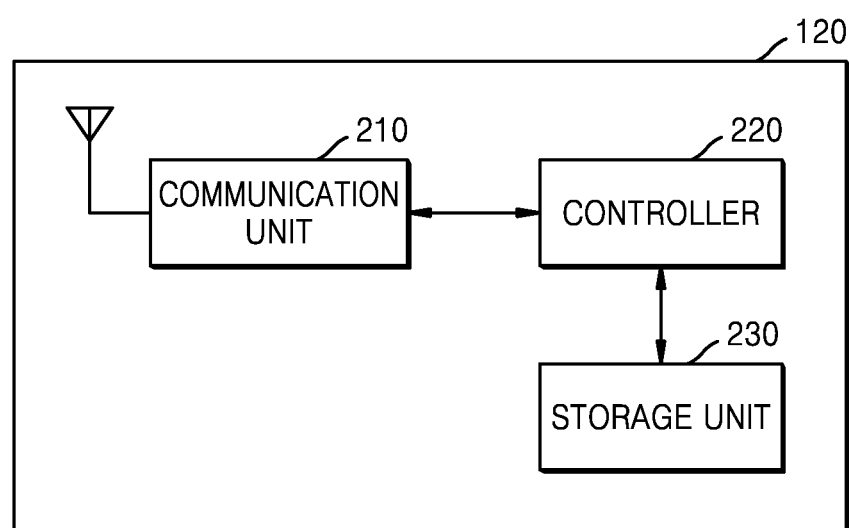
FIG. 2 is a block diagram illustrating a receiver of FIG. 1, according to an embodiment.

FIG. 2 is a block diagram illustrating the receiver 120 of FIG. 1, according to an embodiment.

A term such as 'unit' and 'part' used herein indicates a unit for processing at least one function or operation and may be implemented using hardware, software, or a combination of hardware and software.

Referring to FIG. 2, the receiver 120 may include a communication unit 210, a controller 220, and a storage 230.

The communication unit 210 may perform functions for transmitting and receiving signals through a wireless channel. That is, the communication unit 210 may process a signal received from the transmitter 110. For example, the communication unit 210 may perform reception of a radio frequency (RF) signal, conversion of frequency, demodulation, decoding, removing of a cyclic prefix (CP), and Fast Fourier transform (FFT), channel estimation, equalization, etc.

The controller 220 controls overall operations of the receiver 120. For example, the controller 220 may receive a signal transmitted from the transmitter 110 through the communication unit 210 and control the communication unit 210. In addition, the controller 220 may write or read data in or from the storage 230. To this end, the controller 220 may include at least one processor, a microprocessor, or a microcontroller, or may be a part of a processor.

The storage 230 may store data such as a base program, an application program, and setting information for the operation of the receiver 120. For example, the storage 230 may perform functions for storing data processed by the controller 220. Accordingly, the storage 230 may store control channel information or data channel information, channel characteristic maintenance time information, etc. of a previous TTI. Also, the storage 230 may include a volatile memory, a nonvolatile memory, or a combination of a volatile memory and a nonvolatile memory. For example, the storage 230 may include RAM, flash memory, etc.

In FIG. 2, the receiver 120 includes the communication unit 210, the controller 220, and the storage 230. Two or more of the communication unit 210, the controller 220, and the storage 230 may be integrated into one, and the receiver 120 may further include an additional component in addition to the above-described component. However, for convenience of description, the receiver 120 including the above-described components will be described as an example.

Figure 3:
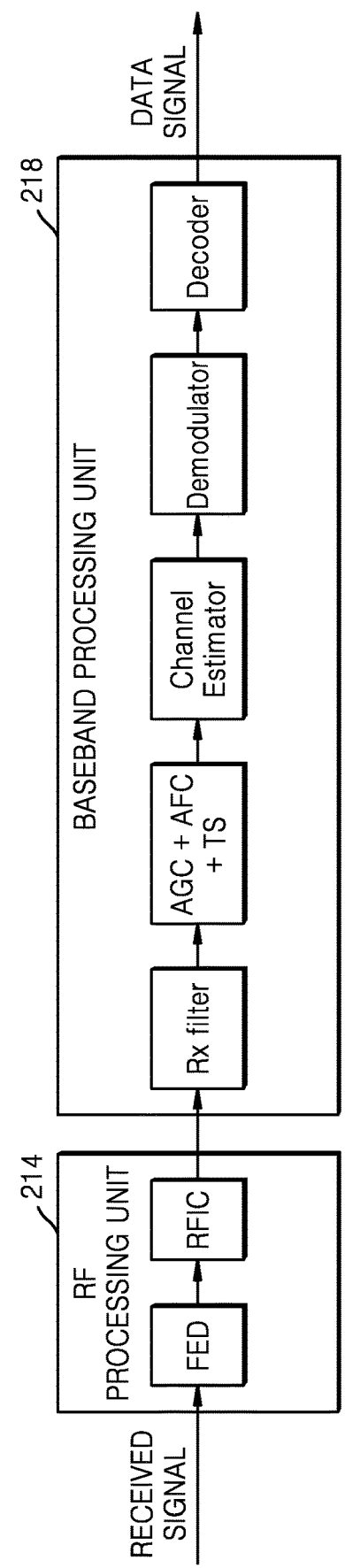
FIG. 3 is a block diagram illustrating a communication unit of FIG. 2, according to an embodiment.

FIG. 3 is a block diagram illustrating the communication unit 210 of FIG. 2, according to an embodiment.

Referring to FIG. 3, the communication unit 210 may include a radio frequency (RF) processing unit 214 that converts an RF signal, for example a high frequency band signal, into a baseband signal, for example a low frequency band signal, and a baseband processing unit 218 that processes the baseband signal.

Specifically, the RF processing unit 214 may include a Front End Module (FED) and a Radio Frequency IC (RFIC). In addition, the FED and the RFIC may include at least one of a phase locked loop (PLL), a voltage control oscillator (VCO), a low noise amplifier (LNA), a mixer, a local oscillator (LO), and an analog-to-digital converter (ADC).

In addition, the baseband processing unit 218 may include at least one of an RX filter, an automatic gain controller (AGC), an automatic frequency controller (AFC), a timing synchronizer (TS), a channel estimator, a demodulator, and a decoder.

Here, the RX filter may filter only frequency signals that may be received and processed by the terminal from among downlink signals received from antenna ports of a base station through a wireless channel. The RX filter may also convert the received signals into digital signals. That is, an ADC may be included in the RX filter.

An AGC may control a gain to maintain the magnitude of the received signal at an appropriate level, and an AFC may obtain frequency synchronization of the received signal.

In addition, a TS may obtain time synchronization of the received signal, and a channel estimator may estimate the channel value with respect to each resource element based on a reference signal received from the base station.

In addition, the demodulator may detect a data signal based on the estimated channel value and the received signal and demodulate the detected value. Here, the operation of detecting the data signal may include an operation of obtaining the data signal estimated by using a channel value, for example the estimated channel value, corresponding to the resource element, for example a resource element to which the data signal is mapped.

The decoder may obtain a data signal intended to be transmitted from the base station to the terminal by descrambling and decoding the demodulated data signal.

For reference, depending on the situation, for example when the channel information of a previous TTI is reused for a channel decoding operation of a current TTI, the channel estimation operation of the channel estimator may be skipped in the baseband processing unit 218.

Further, the communication unit 210 may further include components other than the components illustrated in FIG. 3 or may not include some of the components illustrated in FIG. 3. For convenience of explanation, the communication unit 210 including the components shown in FIG. 3 will be described as an example.

As described above, the communication unit 210 may include the above-described components, and the operation of each component may be controlled by the controller 220.

In embodiments, the receiver 120 may operate in a channel adaptive power control mode in order to reduce power consumed when receiving data. In this case, the controller 220 may individually control each component of the communication unit 210.

A more detailed description of the channel adaptive power control mode of the receiver 120 will be described later.

For reference, a signal reception operation of the receiver 120 according to an embodiment will be described as follows.

Specifically, in the wireless communication system 100 according to an embodiment, the receiver 120; for example, a user terminal, may decode a control channel, for example a downlink control channel, transmitted from the transmitter 110; for example, the base station, every TTI to obtain various information, for example downlink data grant, downlink data format, uplink data grant, uplink data format, uplink power control, etc. When a decoding operation is completed, the receiver 120 may determine whether there is a data channel, for example a downlink data channel, in the corresponding TTI, for example TTI1, based on the presence or absence of the downlink data grant.

When there is not a data channel in the corresponding TTI, the receiver 120 may turn off the power of the communication unit 210 until a next TTI., for example TTI2, starts in order to save power. That is, when the controller 220 obtains information that there is not a downlink data grant, the controller 220 may turn off each component in the communication unit 210 as soon as possible. For reference, an interval, for example t3-t4 and t5-t6 in FIG. 5, in which the power of the communication unit 210 may be turned off is referred to as a power controllable interval.

In the case of a unit requiring a stabilization time after turn-on, such as the RF processing unit 214 in the communication unit 210, considering the stabilization time, the unit may be turned on by the controller 220 before a next TTI, for example TTI2, starts to prepare for reception of a signal from the transmitter 110 in FIG. 1.

In embodiments, turning off a unit, device, or other component may be referred to as deactivating the unit, device, or other component, and turning on a unit, device, or other component may be referred to as activating the unit, device, or other component.

Further, in the embodiment, when the channel characteristic in the previous TTI is maintained in the current TTI, a channel estimation value with respect to the control channel or the data channel obtained in the previous TTI, or another value, for example a signal-to-noise ratio (SNR) and noise plus interference variance (NIV) estimation value, a Doppler estimation value, a delay spread estimation value, and an interference whitening (IW) filter, may be reused even in the current TTI such that the decoding time with respect to the control channel or data channel may be shortened in the current TTI.

That is, when the channel characteristic in the previous TTI is maintained even in the current TTI, the decoding operation on the control channel may be completed earlier compared to a related art method because there is no need to perform the channel estimation operation on the control channel in the current TTI. Furthermore, when it is determined that there is not a data channel in the current TTI as a result of decoding the control channel, the controller 220 may turn off each component in the communication unit 210 faster by the time required for various estimation and filter generation tasks required for channel decoding, thereby reducing power consumption when receiving data.

For reference, the channel characteristic may refer to various channel-related characteristics such as the number of reflected waves on a signal path, a phase of the reflected waves, a time delay, signal power, etc.

As such, the signal reception operation of the receiver 120 may be performed as described above. Hereinafter, examples of the channel adaptive power control mode operation of the receiver 120 will be described in detail with reference to FIGS. 4 to 6.

For reference, FIGS. 4 to 6 will be described together with reference to FIGS. 1 to 3.

Figure 4:
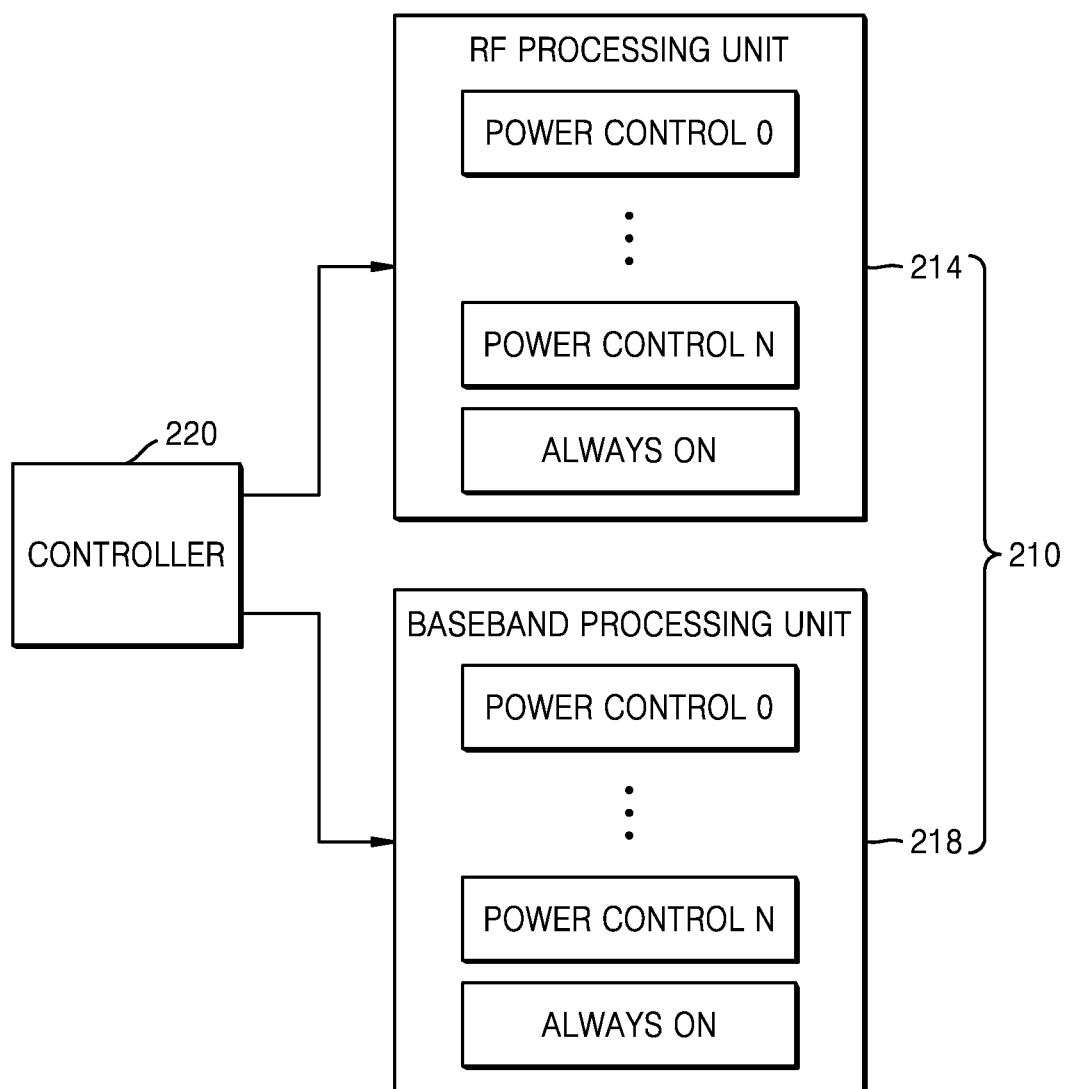
FIG. 4 is a diagram illustrating a channel adaptive power control mode implemented by the receiver of FIG. 1, according to an embodiment.

Referring to FIG. 4, a channel adaptive power control mode operation of the receiver 120 is illustrated.

Specifically, when the receiver 120 operates in a channel adaptive power control mode, the controller 220 may selectively turn off each component of the communication unit 210 in the above-described situation when power saving is possible.

Specifically, the controller 220 may determine whether to decode a control channel of a current TTI based on control channel information of a previous TTI, and control the communication unit 210 to decode a control channel of the current TTI based on a determination result. Also, the controller 220 may determine whether there is a data channel in the current TTI based on a decoding result, and determine whether to turn off the communication unit 210 based on the determination result.

Here, when it is determined that the data channel is not in the current TTI, the controller 220 may turn off some components of the communication unit 210, switch some other components of the communication unit 210 to a standby state or a sleep state, and maintain the remaining components of the communication unit 210 in an always on state.

In order to receive a new signal from the transmitter 110 in a TTI that immediately follows the current TTI, the controller 220 may, immediately before the current TTI ends, turn on some components of the communication unit 210 which have been turned off, and reactivate some other components of the communication unit 210 that have switched to the standby state or the sleep state.

For reference, in the case of the components of the RF processing unit 214 such as PLL, VCO, LNA, mixer, LO, ADC, etc. a switching time and an internal initial value considering a warm-up time may be different for each component. Here, the internal initial value may mean an arbitrary initial value that is set when power is turned off and then turned on. For example, in the case of the PLL, when power is turned off and then turned on, an initial phase value may be set to an arbitrary value.

That is, hardware components for signal reception may have different switching times and internal initial values. Therefore, in order to maximize the power saving effect, the switching time, the time to normalize the internal initial value, etc., may be compared with the power controllable interval, for example power controllable intervals 1 and 2 in FIG. 5, to individually control the power of each component or separately control the power of components having the similar switching time.

In this case, a control interface of the controller 220 with respect to the baseband processing unit 218 and the RF processing unit 214 may be implemented for each component or component group according to the power control frequency. That is, the control interface by the controller 220 may be defined differently according to the power control timing requirement.

In addition, a power control scheme with respect to each component or each component group, represented in FIG. 4 as, for example, power control 0 through power control N and always on, may include not only simple power turn-off but also switching to the standby state, the sleep state, etc. Some components or component groups may be maintained in an always on state.

That is, a control scheme in the channel adaptive power control mode may be defined as turn on/turn off, standby state switching, sleep state switching, always on, etc. based on state switching time, on/off timing, internal initial value, etc. of each component or each component group. Accordingly, when the power controllable interval arrives, some components may be turned off, some components are switched to the standby state or the sleep state, and some components may be maintained in the on state.

Otherwise, when it is determined that there is the data channel in the current TTI, the controller 220 may maintain the communication unit 210 in the on state. Further, the controller 220 may determine whether to decode the data channel of the current TTI based on the data channel information of the previous TTI, and control the communication unit 210 to decode the data channel of the current TTI based on a determination result.

For reference, the data channel information may include at least one of a channel estimation value related to the data channel, an SNR and NIV estimation value, a Doppler estimation value, a delay spread estimation value, and an IW filter In addition, the control channel information may include a channel estimation value related to the control channel, an SNR and NIV estimation value, a Doppler estimation value, a delay spread estimation value, and an IW filter.

For example, in an embodiment, the data channel information may basically include the channel estimation value related to the data channel, and may or may not include other values depending on the situation. Also, the control channel information may basically include the channel estimation value related to the control channel, and may or may not include other values depending on the situation. The disclosure is not limited thereto.

In summary, the controller 220 may control power consumption of the components in the RF processing unit 214 and the baseband processing unit 218 using information about whether there is a data channel obtained through control channel decoding for each TTI. That is, the controller 220 may check whether there is a data channel through control channel decoding in each TTI, and, based on a check result, control the power consumption of each component individually or in groups according to characteristics of the components in the RF processing unit 214 and the baseband processing unit 218. The components in the RF processing unit 214 and the baseband processing unit 218 may be controlled by the controller 220 in a manner that minimizes performance loss and processing time.

Figure 5:
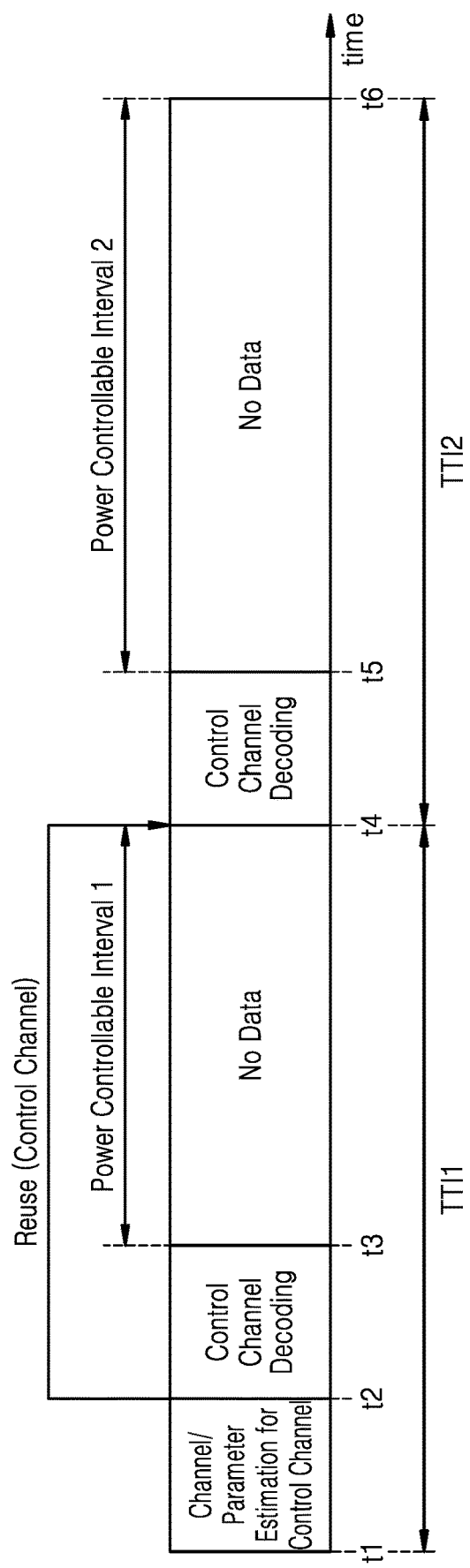
FIG. 5 is a timing diagram illustrating an example of a channel decoding method of the receiver of FIG. 1, according to an embodiment.
Figure 6:
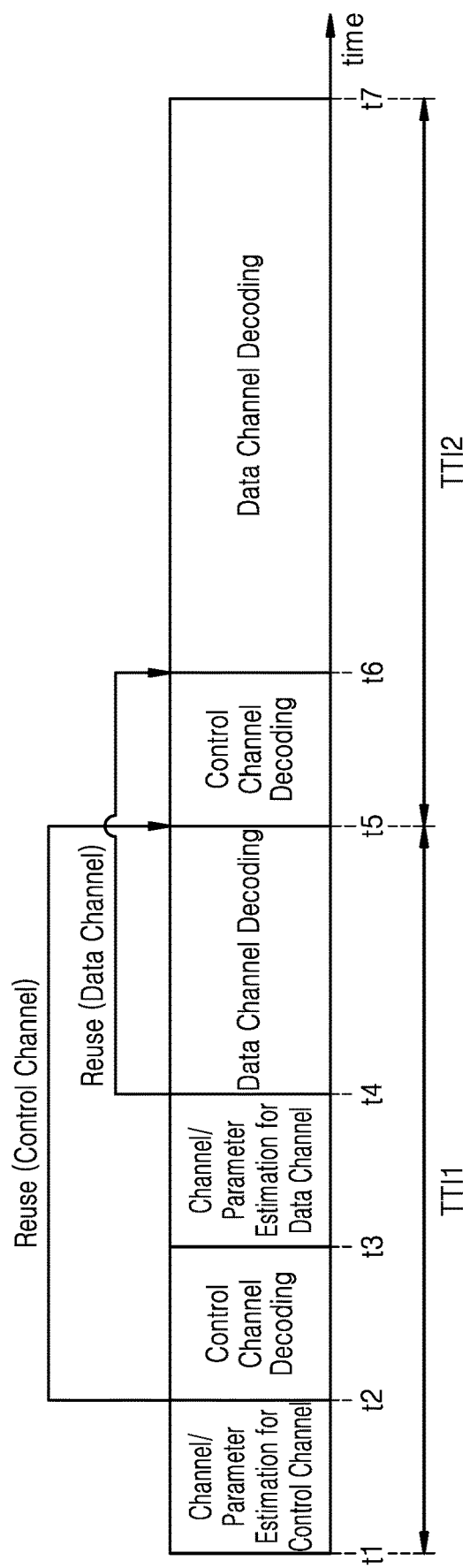
FIG. 6 is a timing diagram illustrating another example of a channel decoding method of the receiver of FIG. 1, according to an embodiment.

Here, referring to FIGS. 5 and 6, a channel decoding method of the receiver 120 driven in the above-described channel adaptive power control mode is illustrated, according to embodiments.

First, referring to FIG. 5, a first TTI TTI1 and a second TTI TTI2 are shown, and an operation of estimating the control channel may be performed during t1 to t2 of the first TTI TTI1. In addition, the control channel decoding operation may be performed during t2 to t3 based on the control channel estimation value, and whether there is a data channel at the first TTI TTI1 may be checked through the corresponding decoding operation.

In addition, when it is determined that there is not a data channel as a result of the decoding operation, t3 to t4 becomes a power controllable interval 1, and thus, the controller 220 may control the power consumption of the components in the RF processing unit 214 and the baseband processing unit 218.

Further, when the channel characteristic between the first TTI TTI1 and the second TTI TTI2 is maintained, the control channel may be decoded during t4 to t5 of the second TTI TTI2 based on the control channel estimation value from the first TTI TTI1. That is, the control channel estimation value from the first TTI TTI1 is reused in the second TTI TTI2.

In addition, as a result of the decoding operation, when it is determined that there is not a data channel, t5 to t6 becomes a power controllable interval 2, and thus, the controller 220 may control the power consumption of the components in the RF processing unit 214 and the baseband processing unit 218.

Because the channel estimation operation of decoding a separate control channel is not performed in the second TTI TTI2, the power controllable interval 2 of the second TTI TTI2 is longer than the power controllable interval 1 of the first TTI TTI1.

Accordingly, the power consumption in the second TTI TTI2 may be reduced compared to the related art.

Next, referring to FIG. 6, the first TTI TTI1 and the second TTI TTI2 are shown, according to an embodiment, and an operation of estimating the control channel may be performed during t1 to t2 of the first TTI TTI1. In addition, the control channel decoding operation may be performed during t2 to t3 based on the control channel estimation value, and whether there is a data channel from the first TTI TTI1 may be checked through the corresponding decoding operation.

In addition, when it is determined that there is a data channel as a result of the decoding operation, an operation of estimating the data channel may be performed during t3 to t4. In addition, the data channel decoding operation may be performed during t4 to t5 based on the data channel estimation value, and the data signal may be obtained at the first TTI TTI1 through the corresponding decoding operation.

Further, when the channel characteristic between the first transmission time interval TTI1 and the second transmission time interval TTI2 is maintained, the control channel may be decoded during t5 to t6 of the second TTI TTI2 based on the control channel estimation value from the first TTI TTI1. That is, the control channel estimation value in the first TTI TTI1 is reused in the second TTI TTI2.

In addition, when it is determined that there is a data channel as a result of the decoding operation, the data channel may be decoded during t6 to t7 of the second TTI TTI2 based on the data channel estimation value from the first TTI TTI1. That is, the data channel estimation value in the first TTI TTI1 is reused in the second TTI TTI2.

In this case, because the channel estimation operation for separate data channel decoding and control channel decoding is not performed in the second TTI TTI2, power required for performing the corresponding channel estimation operation may be saved.

As described above, in an embodiment, the channel decoding operation is performed by the receiver 120 by using the above-described method in order to reduce power consumed when receiving data. Hereinafter, with reference to FIGS. 7 to 10, an example of a wireless communication method (i.e., a channel decoding method) of the receiver 120 of FIG. 1 will be described in detail.

Figure 7:
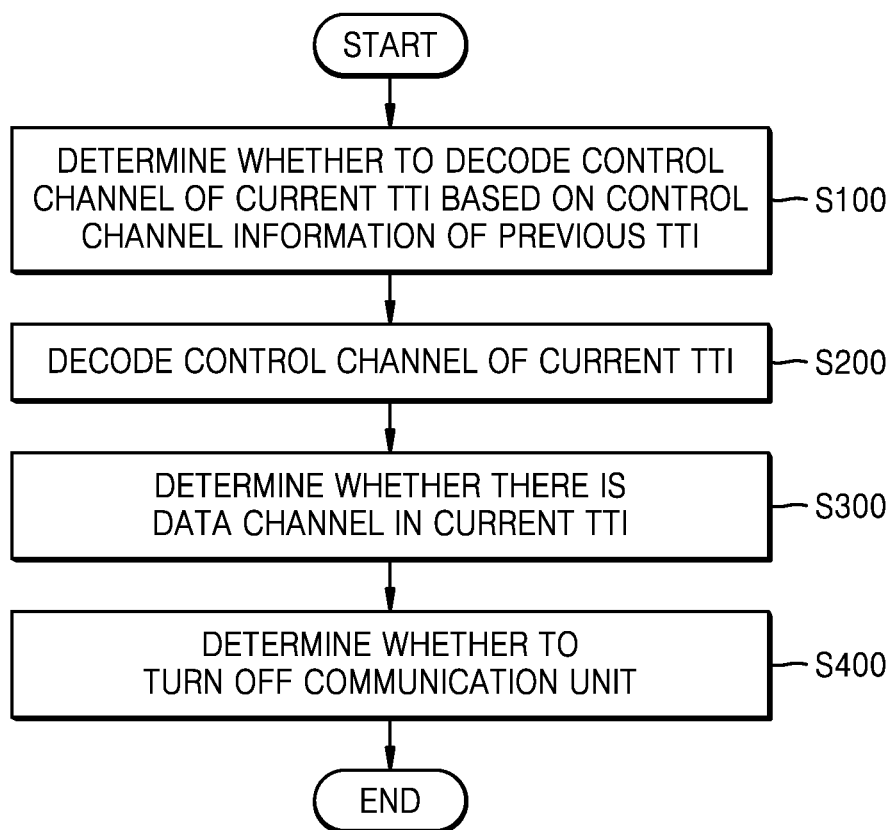
FIG. 7 is a flowchart illustrating an example of a wireless communication method of the receiver of FIG. 1, according to an embodiment.
Figure 8:
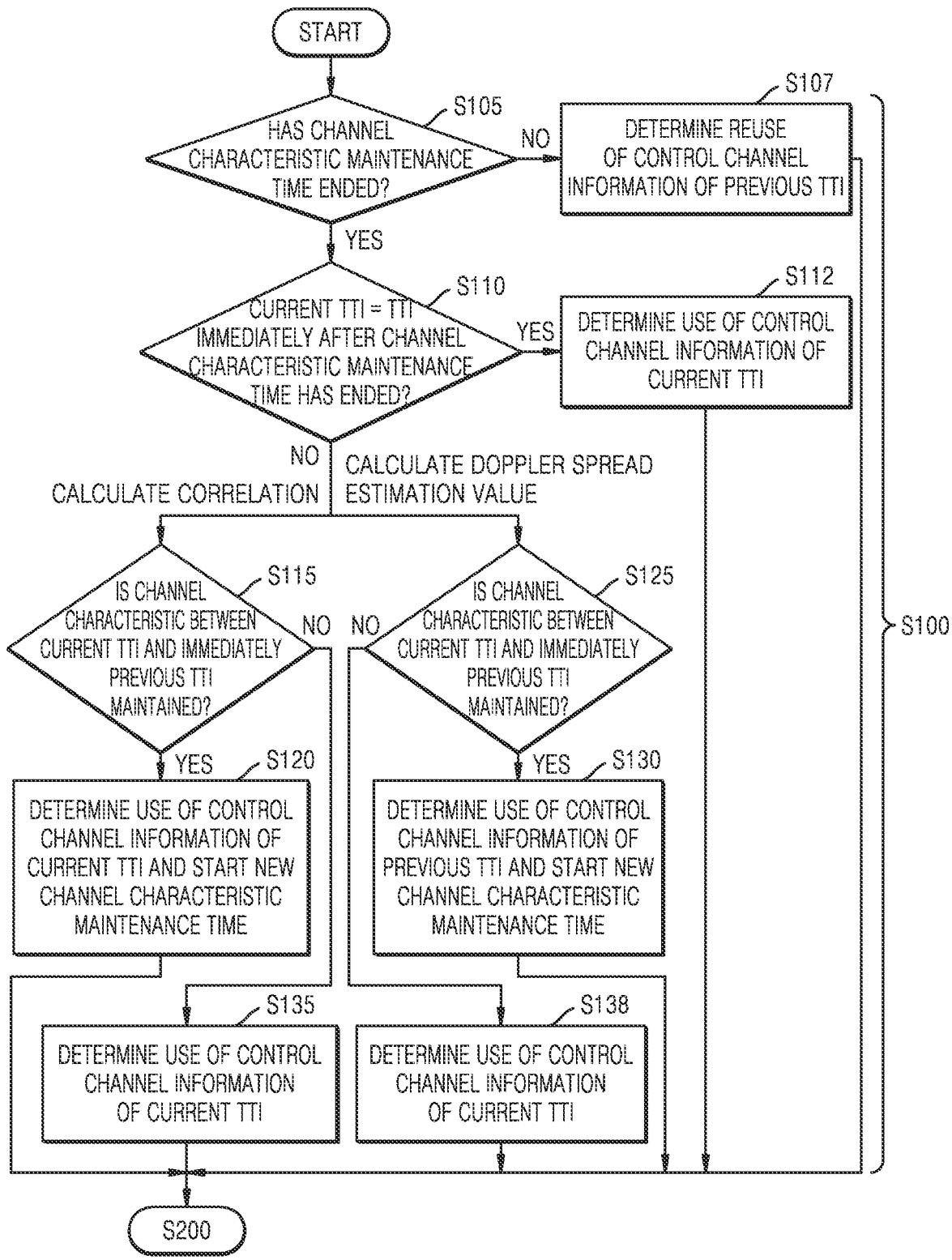
FIG. 8 is a flowchart illustrating an example of S100 in FIG. 7, according to an embodiment.
Figure 9:
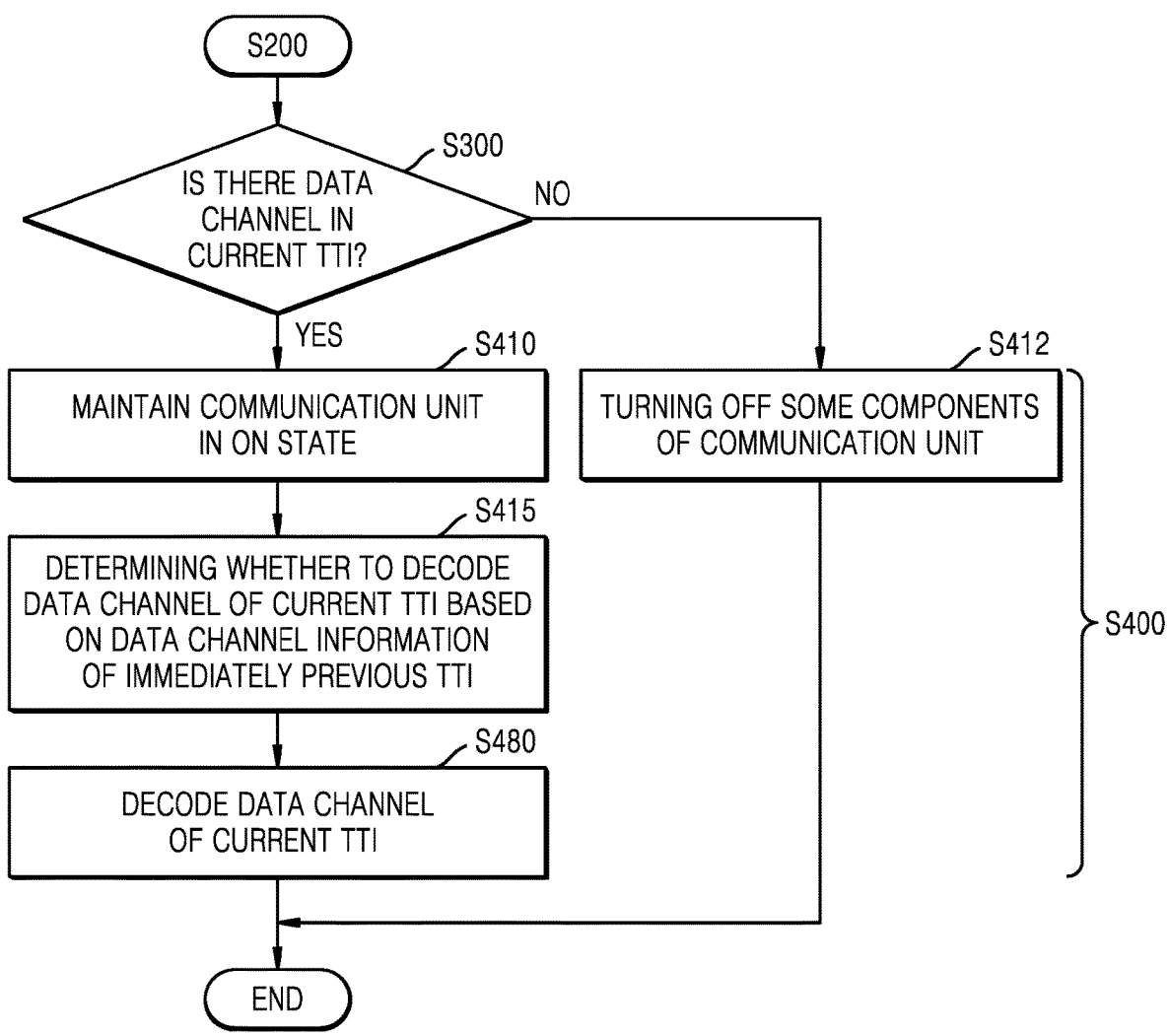
FIG. 9 is a flowchart illustrating an example of S400 of FIG. 7, according to an embodiment.
Figure 10:
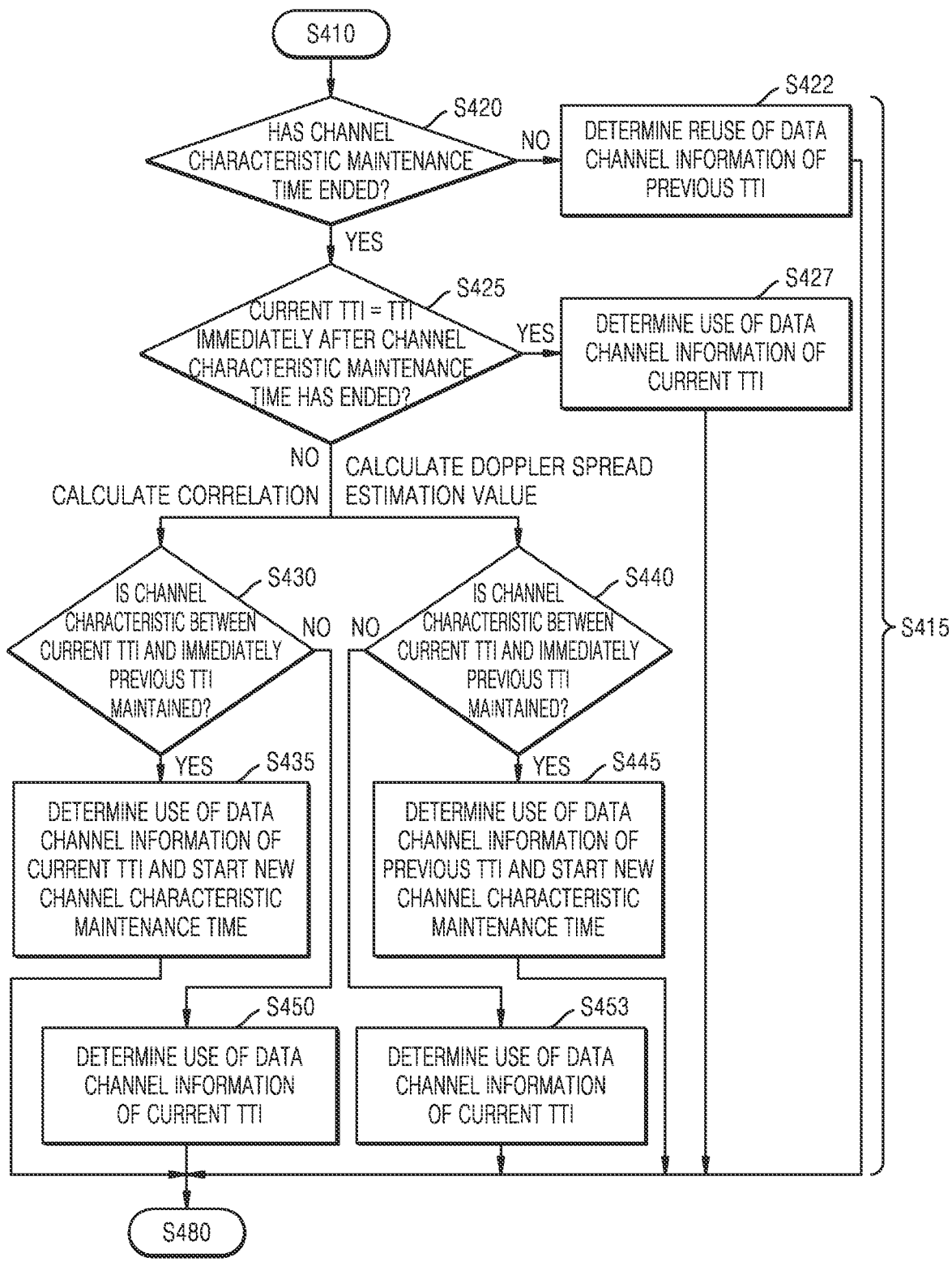
FIG. 10 is a flowchart illustrating an example of S415 of FIG. 9, according to an embodiment.

FIG. 7 is a flowchart illustrating an example of a wireless communication method of the receiver 120 of FIG. 1. FIG. 8 is a flowchart specifically illustrating an example of operation S100 in FIG. 7. FIG. 9 is a flowchart specifically illustrating an example of operation S400 of FIG. 7. FIG. 10 is a flowchart specifically illustrating an example of operation S415 of FIG. 9.

For reference, FIGS. 7 to 10 will be described together with reference to FIGS. 1 to 3.

Referring to FIG. 7, first at operation S100, it is determined whether to decode a control channel of a current TTI based on control channel information of a previous TTI.

Specifically, the controller 220 may determine whether to decode a control channel of a current TTI based on control channel information of a previous TTI. Here, the control channel information of the previous TTI may be stored in the storage 230, and the controller 220 may retrieve and use the control channel information of the previous TTI, stored in the storage 230, through a read operation as necessary.

Operation S100 of determining whether to decode a control channel of a current TTI based on control channel information of a previous TTI may include operation S105 of checking whether a channel characteristic maintenance time has ended and operations S107 to S135 of determining whether to reuse the control channel information of the previous TTI based on a check result of operation S105.

That is, when the current TTI starts, the controller 220 may check whether the channel characteristic maintenance time has ended, and determine whether to reuse the control channel information of the previous TTI in the current TTI based on a check result.

For reference, when it is determined that channel characteristic between adjacent TTIs (e.g., an n TTI and an n+1 TTI) is maintained, the channel characteristic maintenance time may mean a period during which channel information of a specific TTI is reused for a certain period, that is, a period during which channel information of a specific TTI is reused from a next TTI (e.g. an n+2 TTI) to a certain TTI (e.g. an n+9 TTI).

The definition and duration of the channel characteristic maintenance time may vary according to a method of determining whether to maintain the channel characteristic or who a user or manufacturer is.

Here, referring to FIG. 8, an example of a specific process of operation S100 is shown, according to an embodiment.

Operation S100 of determining whether to decode a control channel of a current TTI based on control channel information of a previous TTI may start with operation S105 of determining whether the channel characteristic maintenance time has ended.

Specifically, when it is determined that the channel characteristic maintenance time has not ended in operation S105, the control channel information of the previous TTI may be reused for the control channel decoding of the current TTI in operation S107.

That is, when the channel characteristic maintenance time has not ended, the controller 220 may control the communication unit 210 to reuse the control channel information of the previous TTI stored in the storage 230 and to decode the control channel of the current TTI.

Otherwise, when it is determined that the channel characteristic maintenance time has ended in operation S105, the control channel information of the previous TTI is not reused for the control channel decoding of the current TTI, and control channel information different from the control channel information of the previous TTI may be used for the control channel decoding of the current TTI.

Specifically, when it is determined in operation S110 that the current TTI is a TTI immediately after the channel characteristic maintenance time has ended, the different control channel information may include control channel information newly obtained from the current TTI. In this case, the control channel information newly obtained from the current TTI for example control channel information of the current TTI, may be used for control channel decoding of the current TTI in operation S112.

That is, when the current TTI is the TTI immediately after the channel characteristic maintenance time has ended, the controller 220 may control the communication unit 210 to estimate and obtain new control channel information of the current TTI. The control channel information of the current TTI that is newly estimated and obtained by the communication unit 210 may be stored in the storage 230, and the controller 220 may control the communication unit 210 to use the control channel information of the current TTI stored in the storage 230 and to decode the control channel of the current TTI.

For reference, the TTI immediately after the channel characteristic maintenance time has ended may mean the n+1 TTI when the last TTI of the channel characteristic maintenance time is the n TTI.

Otherwise, when it is determined in operation S110 that the current TTI is not the TTI immediately after the channel characteristic maintenance time has ended, the type of the different control channel information may be determined based on whether to maintain the channel characteristic between the current TTI and the immediately previous TTI of the current TTI in operations S115 to S138.

For reference, the case where the current TTI is not the TTI immediately after the channel characteristic maintenance time has ended may mean a case where the last TTI of the channel characteristic maintenance time is the n TTI, and the current TTI is a TTI equal to or greater than an n+2 TTI. In addition, when the current TTI is the n+2 TTI, the immediately previous TTI of the current TTI may mean the n+1 TTI. In this case, the n+1 TTI is the TTI immediately after the channel characteristic maintenance time has ended. As described above, the control channel of the n+1 TTI may be decoded based on the control channel information of the n+1 TTI.

In addition, whether to maintain the channel characteristic between the current TTI and the immediately previous TTI of the current TTI may be determined based on the correlation between a channel estimation value of the immediately previous TTI and a channel estimation value of the current TTI or the Doppler spread estimation value of the immediately previous TTI.

For reference, how to determine whether to maintain the channel characteristic between the current TTI and the immediately previous TTI may be set in advance by a user or a manufacturer. Accordingly, when 'NO' is determined in operation S110, a corresponding operation may be performed according to the type of a method of determining whether to maintain the preset channel characteristic. For example, when a correlation calculation method is preset, operations S115, S120, and S135 may proceed, and when a method of calculating the Doppler spread estimation value is preset, operations S125, S130, and S138 may proceed. That is, whether to maintain the channel characteristic may be determined based on any one of the correlation calculation method and the Doppler spread estimation value calculation method.

Here, the correlation between the channel estimation value of the immediately previous TTI and the channel estimation value of the current TTI may be calculated by the following Equation 1.

$$\text{correlation} = \frac{E\{\tilde{H}_n \tilde{H}_{(n-1)}^*\}}{E\{|\tilde{H}_n|^2\}} < \gamma_1 \quad \text{(Equation 1)}$$

$\tilde{H}_n$ and $\tilde{H}_{(n-1)}$ may denote a channel estimation value of the n TTI and a channel estimation value of the n−1 TTI, respectively, and a first reference value $\gamma_1$ may denote a reference value with respect to the correlation between channels of adjacent TTIs. In addition, E{ } may denote a probability mean, and * may denote a complex conjugate. $\gamma_1$ may be predefined, for example by a user or manufacturer, as an arbitrary value between 0 and 1.

In addition, it may be determined whether the channel characteristic is maintained between the current TTI and the immediately previous TTI of the current TTI through comparison between the correlation and the first reference value $\gamma_1$.

That is, when the correlation is less than the first reference value $\gamma_1$, it may be determined that the channel characteristic between the current TTI and the immediately previous TTI of the current TTI does not remain the same. Otherwise, when the correlation is greater than or equal to the first reference value $\gamma_1$, it may be determined that the channel characteristic between the current TTI and the immediately previous TTI of the current TTI remains the same.

For reference, the closer the correlation is to 1, the greater the similarity of the channel characteristic between the current TTI and the immediately previous TTI of the current TTI, and the closer the correlation is to 0, the smaller the similarity of the channel characteristic between the current TTI and the immediately previous TTI of the current TTI.

In addition, when it is determined whether the channel characteristic is maintained based on the correlation between the channel estimation values, the controller 220 may read the control channel estimation value of the immediately previous TTI stored in the storage 230 and control the communication unit 210 to obtain a new control channel estimation value of the current TTI. Here, the controller 220 may control the communication unit 210 to estimate and obtain new control channel information other than the control channel estimation value of the current TTI.

In addition, the control channel information of the current TTI that is newly estimated and obtained by the communication unit 210 may be stored in the storage 230, and the controller 220 may calculate a correlation between the channel estimation value of the immediately previous TTI and the channel estimation value of the current TTI based on the control channel estimation value of the immediately previous TTI read from the storage 230 and the control channel estimation value of the current TTI that is newly obtained by the communication unit 210. Furthermore, the controller 220 may determine whether maintain the channel characteristic is maintained between the current TTI and the immediately previous TTI by comparing the correlation between the channel estimation values with the first reference value $\gamma_1$.

Based on the correlation between the channel estimation value of the immediately previous TTI and the channel estimation value of the current TTI calculated as described above, it may be determined whether the channel characteristic is maintained between the current TTI and the immediately previous TTI.

In embodiments, the other control channel information may be determined as follows based on the method of determining whether to maintain the channel characteristic described above.

Specifically, when it is determined in operation S115 that the correlation between the channel estimation value of the immediately previous TTI and the channel estimation value of the current TTI indicates that the channel characteristic between the current TTI and the immediately previous TTI is maintained, at operation S120 the other control channel information may include the control channel information newly obtained in the current TTI, and the channel characteristic maintenance time may restart with respect to an immediately following TTI of the current TTI.

That is, when the correlation between the channel estimation values indicates that the channel characteristic between the current TTI and the immediately previous TTI is maintained, for example when the correlation between the channel estimation values is greater than or equal to the first reference value $\gamma_1$, the controller 220 may control the communication unit 210 to decode the control channel of the current TTI by using the control channel information of the current TTI stored in the storage 230.

In addition, the controller 220 controls the communication unit 210 such that the channel characteristic maintenance time restarts with respect to the immediately following TTI (e.g., an n+3 TTI) of the current TTI (e.g., an n+2 TTI), and thus, control channels of all TTIs including the immediately following TTI within the channel characteristic maintenance time may be decoded based on the control channel information of the current TTI.

Otherwise, when it is determined in operation S115 that the correlation between the channel estimation value of the immediately previous TTI and the channel estimation value of the current TTI indicates that the channel characteristic between the current TTI and the immediately previous TTI is not maintained, at operation S135 the other control channel information may include the control channel information newly obtained in the current TTI.

That is, when the correlation between the channel estimation values indicates that the channel characteristic between the current TTI and the immediately previous TTI is not maintained, for example when the correlation between the channel estimation values is less than the first reference value γ1, the controller 220 may control the communication unit 210 to decode the control channel of the current TTI by using the control channel information of the current TTI stored in the storage 230.

For reference, when operation S100 is completed with operation S135, when the immediately following TTI (e.g., the n+3 TTI) of the current TTI (e.g., the n+2 TTI) arrives, the controller 220 may repeat the same operation as operation S115 on the current TTI and the following TTI.

That is, the controller 220 may read the channel estimation value of the current TTI (e.g., n+2 TTI) stored in the storage 230, and control the communication unit 210 to obtain a new control channel estimation value of the immediately following TTI (e.g., the n+3 TTI) of the current TTI. Here, the controller 220 may control the communication unit 210 to estimate and obtain new control channel information other than the control channel estimation value of the immediately following TTI.

The control channel information of the immediately following TTI that is newly estimated and obtained by the communication unit 210 may be stored in the storage 230, and the controller 220 may calculate a correlation between the channel estimation value of the current TTI and the channel estimation value of the following TTI based on the control channel estimation value of the current TTI read from the storage 230 and the control channel estimation value of the following TTI that is newly obtained by the communication unit 210. Furthermore, the controller 220 may determine whether maintain a channel characteristic is maintained between the current TTI and the immediately following TTI by comparing the correlation between the channel estimation values with the first reference value γ1.

In embodiments, as described above, the other control channel information may be determined by using another method of determining whether the channel characteristic is maintained.

That is, whether maintain the channel characteristic is maintained between the current TTI and the immediately previous TTI of the current TTI may be determined based on the Doppler spread estimation value of the immediately previous TTI.

Here, the Doppler spread estimation value of the immediately previous TTI (e.g., the n−1 TTI when the current TTI is the n TTI) may be compared with a reference value as in the following Equation 2.

$$\text{Doppler spread estimation value} = D_{(n-1)} < \gamma_2 \quad \text{(Equation 2)}$$

$D_{(n-1)}$ may denote the Doppler spread estimation value of the n−1 TTI, and a second reference value γ2 may denote a reference value with respect to the Doppler spread. For reference, the Doppler spread estimation value may increase as the relative speed between a terminal and a base station increases. γ2 may expressed in a unit of Hz, and may be predefined, for example by a user or manufacturer, as an arbitrary value greater than 0.

In addition, it may be determined whether the channel characteristic is maintained between the current TTI and the immediately previous TTI through comparison between the Doppler spread estimation value and the second reference value γ2.

That is, when the Doppler spread estimation value is less than the second reference value γ2, it may be determined that the channel characteristic between the current TTI and the immediately previous TTI of the current TTI remains the same. Otherwise, when the Doppler spread estimation value is greater than or equal to the second reference value γ2, it may be determined that the channel characteristic between the current TTI and the immediately previous TTI of the current TTI does not remain the same.

For reference, the closer the Doppler spread estimation value is to 0, the greater the similarity of the channel characteristic between the current TTI and the immediately previous TTI of the current TTI, and the greater the Doppler spread estimation value (e.g., when the Doppler spread estimation value exceeds 30 Hz), the smaller the similarity of the channel characteristic between the current TTI and the immediately previous TTI of the current TTI.

In addition, when it is determined whether the channel characteristic is maintained based on the Doppler spread estimation value, the controller 220 may read the Doppler spread estimation value of the immediately previous TTI stored in the storage 230.

In addition, the controller 220 may compare the Doppler spread estimation value of the immediately previous TTI read from the storage 230 with the second reference value γ2 to determine whether to maintain the channel characteristic between the current TTI and the immediately previous TTI.

Based on the Doppler spread estimation value of the immediately previous TTI calculated as described above, it may be determined whether the channel characteristic is maintained between the current TTI and the immediately previous TTI.

In embodiments, the other control channel information may be determined as follows based on the method of determining whether the channel characteristic is maintained described above.

Specifically, when it is determined in operation S125 that the Doppler spread estimation value of the immediately previous TTI indicates that the channel characteristic between the current TTI and the immediately previous TTI is maintained, the other control channel information may include the control channel information obtained in the immediately previous TTI, and the channel characteristic maintenance time may restart with respect to the current TTI in operation S130.

That is, when the Doppler spread estimation value indicates that the channel characteristic between the current TTI and the immediately previous TTI is maintained, for example when the Doppler spread estimation value is less than the second reference value γ2, the controller 220 may control the communication unit 210 to decode the control channel of the current TTI by using the control channel information of the immediately previous TTI stored in the storage 230.

In addition, the controller 220 controls the communication unit 210 such that the channel characteristic maintenance time restarts with respect to the current TTI (e.g., the n TTI), and thus, control channels of all TTIs including the current TTI within the channel characteristic maintenance time may be decoded based on the control channel information of the immediately previous TTI.

Otherwise, when it is determined in operation S125 that the Doppler spread estimation value of the immediately previous TTI indicates that the channel characteristic between the current TTI and the immediately previous TTI is not maintained, the other control channel information may include the control channel information newly obtained in the current TTI in operation S138.

That is, when the Doppler spread estimation value indicates that the channel characteristic between the current TTI and the immediately previous TTI is not maintained, for example when the Doppler spread estimation value is greater than or equal to the second reference value $\gamma2$, the controller 220 may control the communication unit 210 to obtain new control channel information of the current TTI.

The control channel information of the current TTI that is newly estimated and obtained by the communication unit 210 may be stored in the storage 230, and the controller 220 may control the communication unit 210 to decode the control channel of the current TTI by using the control channel information of the current TTI stored in the storage 230.

For reference, when operation S100 is completed with operation S138, when an immediately following TTI (e.g., the n+1 TTI) of the current TTI (e.g., the n TTI) arrives, the controller 220 may repeat operation S125 on the current TTI and the immediately following TTI.

That is, the controller 220 may read the Doppler spread estimation value of the current TTI stored in the storage 230. In addition, the controller 220 may compare the Doppler spread estimation value of the current TTI read from the storage 230 with the second reference value $\gamma2$ to determine whether the channel characteristic is maintained between the current TTI and the immediately following TTI.

For reference, in addition to the above-described two methods of determining whether maintain the channel characteristics are maintained, a method of determining whether maintain channel characteristic is maintained using various channel information may be used, and thus, a detailed description thereof is omitted.

Referring back to FIG. 7, the control channel of the current TTI is decoded based on the determination result of operation S100 in operation S200.

Specifically, the controller 220 may control the communication unit 210 to decode the control channel of the current TTI based on the determination result obtained through operation S100.

In particular, the controller 220 may control a decoder of the communication unit 210 based on the determination result obtained through operation S100.

When the control channel of the current TTI is decoded in operation S200, it is determined whether there is a data channel in the current TTI based on a decoding result in operation S300.

Specifically, the communication unit 210 may obtain a variety of information, for example downlink data grant, downlink data format, uplink data grant, uplink data format, uplink power control, etc., by decoding the control channel of the current TTI, and the obtained information may be stored in the storage 230 by the controller 220.

When a decoding operation is completed, the controller 220 may determine whether there is a data channel in the current TTI based on whether the downlink data grant is included in the variety of information obtained through the decoding operation.

When it is determined whether there is a data channel in the current TTI in operation S300, it is determined whether to turn off the communication unit 210 that processes the received signal based on the determination result in operation S400.

Here, referring to FIG. 9, an example of operation S400 is shown in detail below, according to an embodiment.

Specifically, when it is determined that there is a data channel in the current TTI based on the decoding result in operation S300, then operation S400 may include operation S410 of maintaining the communication unit 210 in an on state, operation S415 of determining whether to decode the data channel of the current TTI based on the data channel information of the immediately previous TTI, and operation S480 of decoding the data channel of the current TTI based on the determination result.

That is, when there is a data channel in the current TTI, the communication unit 210 may be used to decode the data channel of the current TTI, and thus, the controller 220 may maintain the communication unit 210 in the on state.

In addition, the controller 220 may determine whether to decode the data channel of the current TTI based on the data channel information of the immediately previous TTI. Here, the data channel information of the immediately previous TTI may be stored in the storage 230, and the controller 220 may retrieve and use the data channel information of the immediately previous TTI stored in the storage 230 through a read operation as necessary.

In embodiments, as shown for example in FIG. 10, operation S415 may include operation S420 of checking whether the channel characteristic maintenance time has ended and operations S422 to S453 of determining whether to reuse the data channel information of the immediately previous TTI based on a check result.

That is, when it is determined that there is a data channel in the current TTI, the controller 220 may check whether the channel characteristic maintenance time has ended, and determine whether to reuse the data channel information of the immediately previous TTI in the current TTI based on the check result.

Here, referring to FIG. 10, an example of operation S415 is shown in detail below, according to an embodiment.

Operation S415 of determining whether to decode the data channel of the current TTI based on the data channel information of the immediately previous TTI may start with operation S420 of determining whether the channel characteristic maintenance time has ended.

Specifically, when it is determined that the channel characteristic maintenance time has not ended in operation S420, the data channel information of the immediately previous TTI may be reused for the data channel decoding of the current TTI in operation S422.

That is, when the channel characteristic maintenance time has not ended, the controller 220 may control the communication unit 210 to reuse the data channel information of the immediately previous TTI stored in the storage 230 and to decode the data channel of the current TTI.

In embodiments, when it is determined that the channel characteristic maintenance time has ended in operation S420, the data channel information of the immediately previous TTI is not reused for the data channel decoding of the current TTI, and data channel information different from the data channel information of the immediately previous TTI may be used for the data channel decoding of the current TTI.

Specifically, when the current TTI is a TTI immediately after the channel characteristic maintenance time has ended at operation S425, the different data channel information may include data channel information newly obtained from the current TTI. In this case, the data channel information newly obtained from the current TTI, for example data channel information of the current TTI, may be used for data channel decoding of the current TTI at operation S427.

That is, when the current TTI is the TTI immediately after the channel characteristic maintenance time has ended, the controller 220 may control the communication unit 210 to estimate and obtain new data channel information of the current TTI. The data channel information of the current TTI that is newly estimated and obtained by the communication unit 210 may be stored in the storage 230, and the controller 220 may control the communication unit 210 to use the data channel information of the current TTI stored in the storage 230 and to decode the data channel of the current TTI.

For reference, the TTI immediately after the channel characteristic maintenance time has ended may mean the n+1 TTI when the last TTI of the channel characteristic maintenance time is the n TTI.

In embodiments, when it is determined in operation S425 that the current TTI is not the TTI immediately after the channel characteristic maintenance time has ended, the type of the different control channel information may be determined based on whether to maintain the channel characteristic between the current TTI and the immediately previous TTI of the current TTI in operations S430 to S453.

For reference, the case where the current TTI is not the TTI immediately after the channel characteristic maintenance time has ended may mean a case where the last TTI of the channel characteristic maintenance time is the n TTI, and the current TTI is a TTI equal to or greater than an n+2 TTI. In addition, when the current TTI is the n+2 TTI, the immediately previous TTI of the current TTI may mean the n+1 TTI. In this case, the n+1 TTI is the TTI immediately after the channel characteristic maintenance time has ended. As described above, the data channel of the n+1 TTI may be decoded based on the data channel information of the n+1 TTI.

In addition, whether the channel characteristic is maintained between the current TTI and the immediately previous TTI of the current TTI may be determined based on the correlation between a channel estimation value of the immediately previous TTI and a channel estimation value of the current TTI or the Doppler spread estimation value of the immediately previous TTI.

For reference, method used to determine whether the channel characteristic is maintained between the current TTI and the immediately previous TTI may be set in advance, for example by a user or a manufacturer. Accordingly, when 'NO' is determined in S425, a corresponding operation may be performed according to the type of a method of determining whether the preset channel characteristic is maintained. For example, when a correlation calculation method is preset, operations S430, S435, and S450 may proceed, and when a method of calculating the Doppler spread estimation value is preset, operations S440, S445, and S453 may proceed.

Here, the correlation between the channel estimation value of the immediately previous TTI and the channel estimation value of the current TTI may be calculated by the following Equation 3.

$$\text{correlation} = \frac{E\{\tilde{H}_n \tilde{H}_{(n-1)^*}\}}{E\{|\tilde{H}_n|^2\}} < \gamma_1 \quad \text{(Equation 3)}$$

$\tilde{H}_n$ and $\tilde{H}_{(n-1)}$ may denote a channel estimation value of the n TTI and a channel estimation value of the n−1 TTI, respectively, and a first reference value $\gamma 1$ may denote a reference value with respect to the correlation between channels of adjacent TTIs. In addition, $E\{\ \}$ may denote a probability mean, and * may denote a complex conjugate. $\gamma 1$ may be predefined, for example by a user or manufacturer, as an arbitrary value between 0 and 1.

In addition, it may be determined whether the channel characteristic is maintained between the current TTI and the immediately previous TTI of the current TTI through comparison between the correlation and the first reference value $\gamma 1$.

That is, when the correlation is less than the first reference value $\gamma 1$, it may be determined that the channel characteristic between the current TTI and the immediately previous TTI of the current TTI does not remain the same. In embodiments, when the correlation is greater than or equal to the first reference value $\gamma 1$, it may be determined that the channel characteristic between the current TTI and the immediately previous TTI of the current TTI remains the same.

For reference, the closer the correlation is to 1, the greater the similarity of the channel characteristic between the current TTI and the immediately previous TTI of the current TTI, and the closer the correlation is to 0, the smaller the similarity of the channel characteristic between the current TTI and the immediately previous TTI of the current TTI.

In addition, when it is determined whether the channel characteristic is maintained based on the correlation between the channel estimation values, the controller 220 may read the data channel estimation value of the immediately previous TTI stored in the storage 230 and control the communication unit 210 to obtain a new data channel estimation value of the current TTI. Here, the controller 220 may control the communication unit 210 to estimate and obtain new data channel information other than the data channel estimation value of the current TTI.

In addition, the data channel information of the current TTI that is newly estimated and obtained by the communication unit 210 may be stored in the storage 230, and the controller 220 may calculate a correlation between the channel estimation value of the immediately previous TTI and the channel estimation value of the current TTI based on the data channel estimation value of the immediately previous TTI read from the storage 230 and the data channel estimation value of the current TTI that is newly obtained by the communication unit 210. Furthermore, the controller 220 may determine whether to maintain the channel characteristic between the current TTI and the immediately previous TTI by comparing the correlation between the channel estimation values with the first reference value $\gamma 1$.

Based on the correlation between the channel estimation value of the immediately previous TTI and the channel estimation value of the current TTI calculated as described above, it may be determined whether the channel characteristic is maintained between the current TTI and the immediately previous TTI.

In embodiments, the other data channel information may be determined as follows based on the method of determining whether the channel characteristic is maintained described above.

Specifically, when it is determined in operation S430 that the correlation between the channel estimation value of the immediately previous TTI and the channel estimation value of the current TTI indicates that the channel characteristic between the current TTI and the immediately previous TTI is maintained, the other data channel information may include the data channel information newly obtained in the current TTI, and the channel characteristic maintenance time may restart with respect to an immediately following TTI of the current TTI in operation S435.

That is, when the correlation between the channel estimation values indicates that the channel characteristic between the current TTI and the immediately previous TTI is maintained, for example when the correlation between the channel estimation values is greater than or equal to the first reference value γ1, the controller 220 may control the communication unit 210 to decode the data channel of the current TTI by using the data channel information of the current TTI stored in the storage 230.

In addition, the controller 220 controls the communication unit 210 such that the channel characteristic maintenance time restarts with respect to the immediately following TTI (e.g., the n+3 TTI) of the current TTI (e.g., the n+2 TTI), and thus data channels of all TTIs including the following TTI within the channel characteristic maintenance time may be decoded based on the data channel information of the current TTI.

In embodiments, when it is determined in operation S430 that the correlation between the channel estimation value of the immediately previous TTI and the channel estimation value of the current TTI indicates that the channel characteristic between the current TTI and the immediately previous TTI is not maintained, the other control channel information may include the data channel information newly obtained in the current TTI in operation S450.

That is, when the correlation between the channel estimation values indicates that the channel characteristic between the current TTI and the immediately previous TTI is not maintained, for example when the correlation between the channel estimation values is less than the first reference value γ1, the controller 220 may control the communication unit 210 to decode the data channel of the current TTI by using the data channel information of the current TTI stored in the storage 230.

For reference, when operation S415 is completed with operation S450, when the immediately following TTI (e.g., the n+3 TTI) of the current TTI (e.g., the n+2 TTI) arrives, the controller 220 may repeat the same operation as operation S430 on the current TTI and the following TTI.

That is, the controller 220 may read the channel estimation value of the current TTI (e.g., the n+2 TTI) stored in the storage 230, and control the communication unit 210 to obtain a new data channel estimation value of the immediately following TTI (e.g., the n+3 TTI) of the current TTI. Here, the controller 220 may control the communication unit 210 to estimate and obtain new data channel information other than the data channel estimation value of the immediately following TTI.

The data channel information of the immediately following TTI that is newly estimated and obtained by the communication unit 210 may be stored in the storage 230, and the controller 220 may calculate a correlation between the channel estimation value of the current TTI and the channel estimation value of the following TTI based on the data channel estimation value of the current TTI read from the storage 230 and the data channel estimation value of the following TTI that is newly obtained by the communication unit 210. Furthermore, the controller 220 may determine whether to maintain a channel characteristic between the current TTI and the immediately following TTI by comparing the correlation between the channel estimation values with the first reference value γ1.

In embodiments, as described above, the other data channel information may be determined by using another method of determining whether the channel characteristic is maintained.

That is, whether the channel characteristic is maintained between the current TTI and the immediately previous TTI of the current TTI may be determined based on the Doppler spread estimation value of the immediately previous TTI.

Here, the Doppler spread estimation value of the immediately previous TTI (e.g., the n−1 TTI; the current TTI is the n TTI) may be compared with a reference value as in the following Equation 4.

$$\text{Doppler spread estimation value} = D_{(n-1)} < \gamma_2 \qquad \text{(Equation 4)}$$

$D_{(n-1)}$ may denote the Doppler spread estimation value of the n−1 TTI, and a second reference value γ2 may denote a reference value with respect to the Doppler spread. For reference, the Doppler spread estimation value may increase as the relative speed between a terminal and a base station increases. γ2 may be expressed in a unit of Hz, and may be predefined, for example by a user or manufacturer, as an arbitrary value greater than 0.

In addition, it may be determined whether the channel characteristic is maintained between the current TTI and the immediately previous TTI through comparison between the Doppler spread estimation value and the second reference value γ2.

That is, when the Doppler spread estimation value is less than the second reference value γ2, it may be determined that the channel characteristic between the current TTI and the immediately previous TTI of the current TTI remains the same. In embodiments, when the Doppler spread estimation value is greater than or equal to the second reference value γ2, it may be determined that the channel characteristic between the current TTI and the immediately previous TTI of the current TTI does not remain the same.

For reference, the closer the Doppler spread estimation value is to 0, the greater the similarity of the channel characteristic between the current TTI and the immediately previous TTI of the current TTI, and the greater the Doppler spread estimation value (e.g., when the Doppler spread estimation value exceeds 30 Hz), the smaller the similarity of the channel characteristic between the current TTI and the immediately previous TTI of the current TTI.

In addition, when it is determined whether the channel characteristic is maintained based on the Doppler spread estimation value, the controller 220 may read the Doppler spread estimation value of the immediately previous TTI stored in the storage 230.

In addition, the controller 220 may compare the Doppler spread estimation value of the immediately previous TTI read from the storage 230 with the second reference value γ2 to determine whether the channel characteristic is maintained between the current TTI and the immediately previous TTI.

Based on the Doppler spread estimation value of the immediately previous TTI calculated as described above, it may be determined whether the channel characteristic is maintained between the current TTI and the immediately previous TTI.

In embodiments, the other data channel information may be determined as follows based on the method of determining whether to maintain the channel characteristic described above.

Specifically, when it is determined in operation S440 that the Doppler spread estimation value of the immediately previous TTI indicates that the channel characteristic between the current TTI and the immediately previous TTI is maintained, the other data channel information may include the data channel information obtained in the immediately previous TTI, and the channel characteristic maintenance time may restart with respect to the current TTI in operation S445.

That is, when the Doppler spread estimation value indicates that the channel characteristic between the current TTI and the immediately previous TTI is maintained, for example when the Doppler spread estimation value is smaller than the second reference value $\gamma 2$, the controller 220 may control the communication unit 210 to decode the data channel of the current TTI by using the data channel information of the immediately previous TTI stored in the storage 230.

In addition, the controller 220 controls the communication unit 210 such that the channel characteristic maintenance time restarts with respect to the current TTI (e.g., the n TTI), and thus data channels of all TTIs including the current TTI within the channel characteristic maintenance time may be decoded based on the data channel information of the immediately previous TTI.

In embodiments, when it is determined in operation S440 that the Doppler spread estimation value of the immediately previous TTI indicates that the channel characteristic between the current TTI and the immediately previous TTI is not maintained, the other data channel information may include the data channel information newly obtained in the current TTI in operation S453.

That is, when the Doppler spread estimation value indicates that the channel characteristic between the current TTI and the immediately previous TTI is not maintained, for example when the Doppler spread estimation value is greater than or equal to the second reference value $\gamma 2$, the controller 220 may control the communication unit 210 to obtain new data channel information of the current TTI.

The data channel information of the current TTI that is newly estimated and obtained by the communication unit 210 may be stored in the storage 230, and the controller 220 may control the communication unit 210 to decode the data channel of the current TTI by using the data channel information of the current TTI stored in the storage 230.

For reference, when an immediately following TTI (e.g., the n+1 TTI) of the current TTI (e.g., the n TTI) arrives after operation S415 is completed with operation S453, the controller 220 may repeat operation S440 on the current TTI and the following TTI.

That is, the controller 220 may read the Doppler spread estimation value of the current TTI stored in storage 230. In addition, the controller 220 may compare the Doppler spread estimation value of the current TTI read from the storage 230 with the second reference value $\gamma 2$ to determine whether to maintain the channel characteristic between the current TTI and the immediately following TTI.

For reference, in addition to the above-described two methods of determining whether the channel characteristics are maintained, a method of determining whether the channel characteristic is maintained using various channel information may be used, and thus a detailed description thereof is omitted.

Referring back to FIG. 9, the data channel of the current TTI may be decoded based on the determination result of operation S415 in operation S480.

Specifically, the controller 220 may control the communication unit 210 to decode the data channel of the current TTI based on the determination result obtained through operation S415.

In particular, the controller 220 may control a decoder of the communication unit 210 based on the determination result obtained through operation S415.

In embodiments, when it is determined that there is not a data channel in the current TTI based on the decoding result in operation S300 o, operation S400 may include operation S412 of turning off some components of the communication unit 210.

That is, when there is not a data channel in the current TTI, for saving power, the communication unit 210 may turn off some components of the communication unit 210.

Specifically, the controller 220 may turn off some components of the communication unit 210, switch some other components of the communication unit 210 to a standby state or a sleep state, and maintain the remaining components of the communication unit 210 in an always on state in operation S412.

That is, based on the method described above in FIG. 4, the controller 220 may selectively turn off each component in the communication unit 210.

As described above, the receiver 120 of FIG. 1 may be driven by using the above-described wireless communication method to reduce power consumed when receiving data. Hereinafter, other examples of the wireless communication method of the receiver of FIG. 1 will be described with reference to FIGS. 11 and 12.

Figure 11:
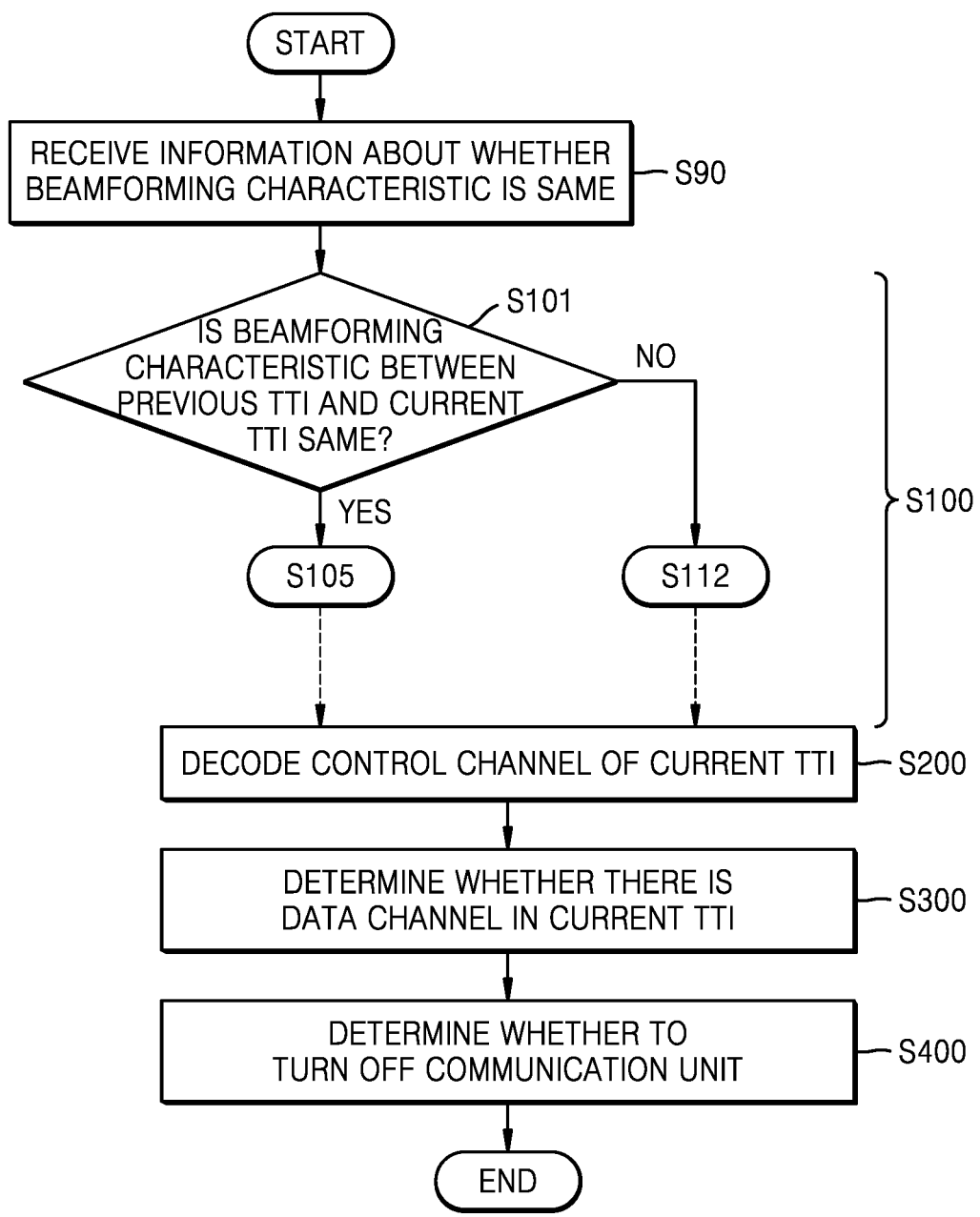
FIG. 11 is a flowchart illustrating an example of a wireless communication method of the receiver of FIG. 1, according to an embodiment.
Figure 12:
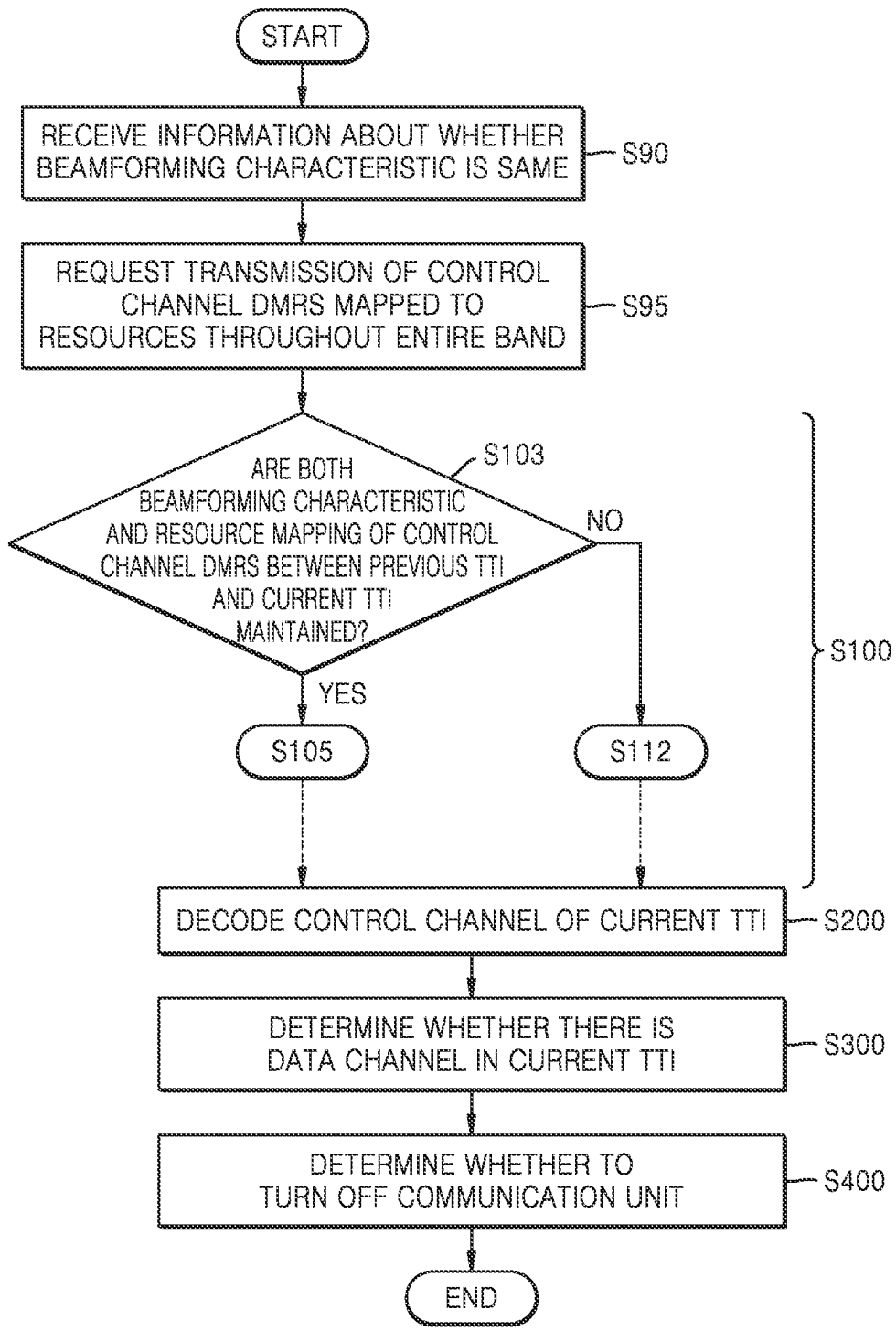
FIG. 12 is a flowchart illustrating an example of a wireless communication method of the receiver of FIG. 1, according to an embodiment.

For reference, the wireless communication methods shown in FIGS. 11 and 12 may correspond to the wireless communication method of FIG. 7 except for some operations, and thus differences will be mainly described.

Referring to FIG. 11, unlike the wireless communication method of FIG. 7, first, information about whether beamforming characteristic is the same is received in operation S90.

Specifically, the communication unit 210 may receive information about whether the beamforming characteristic applied to a immediately previous TTI and a current TTI are the same from the transmitter 110, for example a base station.

Here, the information about whether the beamforming characteristic is the same may be provided to the receiver 120, for example a terminal, through Radio Resource Control (RRC) Signaling or Downlink Control Information (DCI) transmission from the transmitter 110

When the information about whether the beamforming characteristic is the same is received in operation S90, it is determined whether to decode a control channel of the current TTI based on control channel information of the immediately previous TTI in operation S100.

Specifically, operation S100 of determining whether to decode the control channel of the current TTI based on the control channel information of the immediately previous TTI may include operation S101 of checking whether the beamforming characteristic applied to the immediately previous TTI and the current TTI are the same based on the information about whether the received beamforming characteristic is the same and operations (e.g. operations S105 to S138 in FIG. 8) of determining whether to reuse the control channel information of the immediately previous TTI based on a check result.

That is, the communication unit 210 may receive information related to the beamforming characteristic through RRC signaling or DCI transmission from the transmitter 110 and provide the received information related to the beamforming characteristic to the controller 220. In addition, the controller 220 may check whether the beamforming characteristic applied to the immediately previous TTI and the current TTI are the same based on the information related to the beamforming characteristic provided from the communication unit 210. Furthermore, the controller 220 may determine whether to reuse the control channel information of the immediately previous TTI based on the check result.

Accordingly as compared to FIG. 7, FIG. 11 shows an embodiment further including operations S90 and S101.

For reference, in order to increase the quality of a transmission signal, for example the signal that the transmitter 110 transmits to the receiver 120, beamforming may be applied to the transmission signal. Here, the meaning that beamforming is applied to the transmission signal may mean that the transmission signal is precoded.

However, when different beamforming is applied to each TTI, a wireless channel characteristic of the signal transmitted in each TTI to the receiver 120 may vary.

As described above, when the wireless channel characteristics change by beamforming, in the embodiment, the transmitter 110 provides beamforming related information to the receiver 120 through signaling, which may be helpful in improving power saving of the receiver 120.

Specifically, for example, when the receiver 120 obtains beamforming characteristic maintenance information (that is, information that the beamforming characteristic remains the same during two consecutive TTIs) through signaling from the transmitter 110, power saving mechanism according to a channel adaptive power control mode as shown in FIG. 4 may be performed in the receiver 120. When the beamforming characteristic applied during two consecutive TTIs are different, the receiver 120 does not use the channel information of the immediately previous TTI for a channel decoding operation of the current TTI.

Based on this principle, FIG. 11 will be described in more detail as follows.

Specifically, when it is determined that the beamforming characteristic is the same in operation S101 of checking whether the beamforming characteristic applied to the immediately previous TTI and the current TTI are the same, it may be determined whether to reuse the control channel information of the immediately previous TTI based on whether the channel characteristic maintenance time has ended in operation S105.

That is, when it is determined in operation S101 that the beamforming characteristic is the same in the two TTIs, operation S105 described above in FIG. 8 may proceed. A more detailed description of an example of operation S105 is as follows.

When it is determined in operation S105 that the channel characteristic maintenance time has not ended, the control channel information of the immediately previous TTI may be reused for control channel decoding of the current TTI in operation S107.

Specifically, when the channel characteristic maintenance time has not ended, the controller 220 may control the communication unit 210 to reuse the control channel information of the immediately previous TTI stored in the storage 230 and to decode the control channel of the current TTI.

That is, when it is determined in operation S105 that the channel characteristic maintenance time has not ended, operation S107 described above in FIG. 8 may proceed.

In embodiments, when it is determined that the channel characteristic maintenance time has ended at operation S105, the control channel information of the immediately previous TTI is not reused for the control channel decoding of the current TTI, and control channel information different from the control channel information of the immediately previous TTI may be used for the control channel decoding of the current TTI in operations S110 to S138.

Specifically, when the channel characteristic maintenance time has ended, the controller 220 may control the communication unit 210 to use control channel information different from the control channel information of the immediately previous TTI and to decode the control channel of the current TTI.

That is, when it is determined that the channel characteristic maintenance time has ended in operation S105, operation S110 described above in FIG. 8 may proceed.

In embodiments, when it is determined that the beamforming characteristics are not the same in operation S101, the control channel information of the immediately previous TTI is not reused for the control channel decoding of the current TTI, and control channel information newly obtained in the current TTI may be used for the control channel decoding of the current TTI.

Specifically, when the beamforming characteristic between the immediately previous TTI and the current TTI does not remain the same, the controller 220 may control the communication unit 210 to obtain new control channel information of the current TTI. In addition, the control channel information of the current TTI that is newly estimated and obtained by the communication unit 210 may be stored in the storage 230, and the controller 220 may control the communication unit 210 to decode the control channel of the current TTI by using the control channel information of the current TTI stored in the storage 230.

That is, when it is determined in operation S101 that the beamforming characteristic does not remain the same in the two TTIs, operation S112 described above in FIG. 8 may proceed.

For reference, for convenience of explanation, operations after operations S105 and S112 are not specifically shown in operation S100 of FIG. 11, but as described above, operations after operations S105 and S112 may proceed as detailed operation S100 of FIG. 8. In addition, when operation S100 of FIG. 11 is completed, operations S200 to S400 may be sequentially performed as shown in FIG. 7.

The embodiment of FIG. 11 includes operation S90 of receiving the information about whether the beamforming characteristic is the same and operation S101 of checking whether the beamforming characteristic applied to the immediately previous TTI and the current TTI are the same, and thus, the power saving mechanism of the receiver 120 may be improved.

Subsequently, referring to FIG. 12, unlike the wireless communication method of FIG. 11, operation S95 of requesting the transmitter 110, for example the base station, to transmit a control channel Demodulation Reference Signal (DMRS) mapped to resources throughout the entire band may be additionally performed before operation S100.

Here, when the receiver 120, for example the terminal, requests the transmitter 110 to transmit the control channel DMRS, the control channel DMRS transmitted from the transmitter 110 to the receiver 120 may be mapped to resources throughout the entire band.

For reference, in the embodiment of FIG. 12, it is shown that operation S95 proceeds after operation S90, for example an operation of receiving the information about whether the beamforming characteristic is the same, but is not limited thereto. That is, operation S90 and operation S95 may proceed simultaneously, or operation S95 may proceed before operation S90. However, for convenience of explanation, it will be described that operation S95 proceeds between operation S90 and operation S100.

In embodiments, operation S100 of determining whether to decode the control channel of the current TTI based on the control channel information of the immediately previous TTI may include operation S103 of checking whether the beamforming characteristic applied to the immediately previous TTI and the current TTI are the same based on the information about whether the received beamforming characteristic is the same and checking whether resource mapping of the control channel DMRS of the immediately previous TTI and resource mapping of the control channel DMRS of the current TTI are the same and operations S105 to S138 of FIG. 8 of determining whether to reuse the control channel information of the immediately previous TTI based on a check result.

For reference, in operation S103, the information about whether the beamforming characteristic is the same may be provided to the receiver 120 from the transmitter 110 through RRC signaling or DCI transmission. In addition, whether resource mapping of the control channel DMRS are the same may be determined based on whether the control channel DMRS of the immediately previous TTI and the control channel DMRS of the current TTI are mapped throughout the entire band.

Accordingly, the communication unit 210 may receive information related to the beamforming characteristic through RRC signaling or DCI transmission from the transmitter 110 and provide the received information related to the beamforming characteristic to the controller 220. In addition, the controller 220 may check whether the beamforming characteristic applied to the immediately previous TTI and the current TTI are the same based on the information related to the beamforming characteristic provided from the communication unit 210.

In addition, the controller 220 may request the transmitter 110 through the communication unit 210 to transmit the control channel DMRS mapped to resources throughout the entire band. In addition, the controller 220 may check whether the control channel DMRS of the immediately previous TTI and the control channel DMRS of the current TTI received from the communication unit 210 are mapped to resources throughout the entire band and check whether resource mapping of the control channel DMRS of the immediately previous TTI and the current TTI are the same.

Further, the controller 220 may determine whether to reuse the control channel information of the immediately previous TTI based on the above check results.

Accordingly as compared to FIG. 7, FIG. 12 shows am embodiment further including operations S90, S95 and S103.

For reference, even when the beamforming characteristic of the signal transmitted from the transmitter 110 to the receiver 120 remains the same in two consecutive TTIs, if signals transmitted in the two consecutive TTIs are allocated to different frequency ranges, the wireless channel environment of the signals transmitted in the two TTIs may be different.

In particular, in the case of a frequency-selective radio channel under a fading environment, characteristics of the radio channel may vary greatly depending on a frequency range in which a signal is transmitted. In this case, a channel estimation value obtained in the immediately previous TTI may not be used to decode the signal received in the current TTI.

In addition, the receiver 120 performs a channel estimation operation on the control channel by using the control channel DMRS.

Accordingly, in the embodiment, when power saving of the receiver 120 is required, the receiver 120 may request the transmitter 110 to transmit the control channel DMRS throughout the entire band (e.g., wideband) in order to accurately determine whether to maintain the channel characteristic.

In this case, even when the actual control channel is allocated to some frequency bands and transmitted, if the channel estimation operation DMRS with respect to the corresponding control channel is transmitted to the entire band, the receiver 120 may obtain control channel estimation values with respect to all frequency ranges, for example the entire band. Accordingly, the receiver 120 may accurately determine whether to maintain the channel characteristic, and as a result, the power saving mechanism according to the channel adaptive power control mode as shown in FIG. 4 may be performed in the receiver 120.

For reference, the receiver 120 uses the data channel DMRS when performing channel estimation on the data channel. Accordingly, during the data channel estimation operation, the receiver 120 may request the transmitter 110 to transmit the data channel DMRS throughout the entire band (e.g., wideband).

Based on this principle, FIG. 12 will be described in more detail as follows.

For reference, in the embodiment of FIG. 12, it may be assumed that the receiver 120 has received information that the beamforming characteristic remains the same in the immediately previous TTI and the current TTI through signaling from the transmitter 110. That is, in the embodiment of FIG. 12, it may be assumed that the beamforming characteristic remains the same in the immediately previous TTI and the current TTI, and when the beamforming characteristic does not remain the same, operation S112 of FIG. 11 may proceed.

Specifically, in operation S103 of checking whether the beamforming characteristic applied to the immediately previous TTI and the current TTI are the same based on the information about whether the received beamforming characteristic is the same and checking whether resource mapping of the control channel DMRS of the immediately previous TTI and resource mapping of the control channel DMRS of the current TTI are the same, when it is determined that both the beamforming characteristic and resource mapping of the control channel DMRS are the same, it may be determined whether to reuse the control channel information of the immediately previous TTI based on whether the channel characteristic maintenance time has ended in operation S105.

That is, when it is determined in operation S103 that both the beamforming characteristic and the resource mapping remain the same in the two TTIs, operation S105 described above in FIG. 8 may proceed. A more detailed description of an example of operation S105 is as follows.

When it is determined in operation S105 that the channel characteristic maintenance time has not ended, the control channel information of the immediately previous TTI may be reused for control channel decoding of the current TTI in operation S107.

Specifically, when the channel characteristic maintenance time has not ended, the controller 220 may control the communication unit 210 to reuse the control channel information of the immediately previous TTI stored in the storage 230 and to decode the control channel of the current TTI.

That is, when it is determined in operation S105 that the channel characteristic maintenance time has not ended, operation S107 described above in FIG. 8 may proceed.

In embodiments, when it is determined in operation S105 that the channel characteristic maintenance time has ended, the control channel information of the immediately previous TTI is not reused for the control channel decoding of the current TTI, and control channel information different from the control channel information of the immediately previous TTI may be used for the control channel decoding of the current TTI in operations S110 to S138.

Specifically, when the channel characteristic maintenance time has ended, the controller 220 may control the communication unit 210 to use control channel information different from the control channel information of the immediately previous TTI and to decode the control channel of the current TTI.

That is, when it is determined in operation S105 that the channel characteristic maintenance time has ended, operation S110 described above in FIG. 8 may proceed.

In embodiments, in operation S103 of checking whether the beamforming characteristic applied to the immediately previous TTI and the current TTI is the same based on the information about whether the received beamforming characteristic is the same and checking whether resource mapping of the control channel DMRS of the immediately previous TTI and resource mapping of the control channel DMRS of the current TTI are the same, when at least one of the beamforming characteristic and the resource mapping of the control channel DMRS is not the same, the control channel information of the immediately previous TTI is not reused for the control channel decoding of the current TTI, and control channel information newly obtained in the current TTI may be used for the control channel decoding of the current TTI in operation S112.

For reference, the above case may include at least one of, for example, a case where the beamforming characteristic is the same and the resource mapping is different, a case where the beamforming characteristic is different and the resource mapping is the same, and a case where both the beamforming characteristic and the resource mapping are different.

Accordingly, when the beamforming characteristic or resource mapping in the immediately previous TTI and the current TTI does not remain the same, the controller 220 may control the communication unit 210 to obtain new control channel information of the current TTI. In addition, the control channel information of the current TTI that is newly estimated and obtained by the communication unit 210 may be stored in the storage 230, and the controller 220 may control the communication unit 210 to decode the control channel of the current TTI by using the control channel information of the current TTI stored in the storage 230.

That is, when it is determined in operation S103 that the beamforming characteristic or resource mapping does not remain the same in the two TTIs, operation S112 described above in FIG. 8 may proceed.

For reference, for convenience of explanation, in operation S100 of FIG. 12, operations after operations S105 and S112 are not specifically shown, but as described above, operations after operations S105 and S112 may proceed as in the detailed operation S100 of FIG. 8. In addition, when operation S100 of FIG. 12 is completed, operations S200 to S400 may be sequentially performed as shown in FIG. 7.

The embodiment of FIG. 12 includes operation S90 of receiving the information about whether the beamforming characteristics are the same, operation S95 of requesting the transmitter 110 to transmit the control channel DMRS mapped to resources throughout the entire band, and operation S103 of checking whether the beamforming characteristics applied to the immediately previous TTI and the current TTI are the same and checking whether resource mapping of the control channel DMRS of the immediately previous TTI and resource mapping of the control channel DMRS of the current TTI are the same, and thus, the power saving mechanism of the receiver 120 may be improved.

For reference, only descriptions related to the control channel are provided in FIGS. 11 and 12, but the embodiments of FIGS. 11 and 12 may be applied to the data channel in the same manner. However, detailed information is omitted in this regard.

As described above, according to the exemplary embodiment, power efficiency of the receiver may be improved by improving the power saving mechanism that reduces power consumed when the receiver receives data.

While embodiments have been particularly shown and described, it will be understood that various changes in form and details may be made therein without departing from the spirit and scope of the following claims.

What is claimed is:

1. A wireless communication method of a receiver, the wireless communication method comprising:
    performing a first determination of whether to decode a control channel of a current transmission time interval (TTI) based on control channel information of a previous TTI;
    decoding the control channel of the current TTI based on a result of the first determination;
    performing a second determination of whether a data channel is included in the current TTI based on a result of the decoding; and
    performing a third determination of whether to deactivate a communication interface configured to process a received signal based on a result of the second determination.

2. The wireless communication method of claim 1, wherein the first determination comprises:
    checking whether a channel characteristic maintenance time has ended; and
    determining whether to reuse the control channel information of the previous TTI based on a result of the checking.

3. The wireless communication method of claim 2, wherein, based on the result of the checking indicating that the channel characteristic maintenance time has ended, different control channel information which is different from the control channel information of the previous TTI is used to decode the control channel of the current TTI without reusing the control channel information of the previous TTI.

4. The wireless communication method of claim 1, further comprising receiving beamforming information about whether a beamforming characteristic applied to the previous TTI is same as a beamforming characteristic applied to the current TTI from a transmitter,
    wherein the beamforming information is provided to the receiver from the transmitter through radio resource control (RRC) signaling or downlink control information (DCI) transmission.

5. The wireless communication method of claim 4, wherein the first determination comprises determining whether to reuse the control channel information of the previous TTI based on the beamforming information.

6. The wireless communication method of claim 1, further comprising:
receiving beamforming information about whether a beamforming characteristic applied to the previous TTI is same as a beamforming characteristic applied to the current TTI from a transmitter; and
requesting the transmitter to transmit a control channel demodulation reference signal (DMRS) mapped to resources throughout an entire band,
wherein the beamforming information is provided to the receiver from the transmitter through radio resource control (RRC) signaling or downlink control information (DCI) transmission.

7. The wireless communication method of claim 6, wherein the first determination comprises:
checking whether resource mapping of a control channel DMRS of the previous TTI is same as resource mapping of a control channel DMRS of the current TTI; and
determining whether to reuse the control channel information of the previous TTI based on the beamforming information and a result of the checking,
wherein the checking is performed based on whether the control channel DMRS of the previous TTI and the control channel DMRS of the current TTI are mapped to resources throughout the entire band.

8. The wireless communication method of claim 1, wherein based on the second determination indicating that the data channel is included in the current TTI, the third determination comprises:
maintaining the communication interface in an activated state,
performing a fourth determination of whether to decode the data channel based on data channel information of the previous TTI, and
decoding the data channel based on a result of the fourth determination.

9. The wireless communication method of claim 8, wherein the fourth determination comprises:
checking whether a channel characteristic maintenance time has ended; and
determining whether to reuse the data channel information of the previous TTI based on a result of the checking.

10. The wireless communication method of claim 1, wherein based the second determination indicating that the data channel is included in the current TTI, the third determination comprises deactivating some components of the communication interface.

11. A receiver comprising:
a communication interface configured to process a signal received from a transmitter; and
a controller configured to control the communication interface,
wherein the controller is further configured to:
control the communication interface to decode a control channel of a current transmission time interval (TTI) after determining whether to decode the control channel of the current TTI based on control channel information of a previous TTI; and
determine whether to deactivate the communication interface after determining whether a data channel is included in the current TTI based on a decoding result.

12. The receiver of claim 11, wherein, based on determining that the data channel is not included in the current TTI, the controller is further configured to
deactivate some components of the communication interface,
switch other components of the communication interface to a stand-by state or a sleep state, and
maintain remaining components of the communication interface in an always activated state.

13. The receiver of claim 12, wherein, in order to receive a new signal from the transmitter in an immediately following TTI of the current TTI, the controller is further configured to, immediately before the current TTI ends, re-activate the some components of the communication interface, and reactivate the other components of the communication interface that have been switched to the stand-by state or the sleep state.

14. The receiver of claim 11, wherein, based on determining that the data channel is included in the current TTI, the controller is further configured to:
maintain an activated state of the communication interface; and
control the communication interface to decode the data channel after determining whether to decode the data channel based on data channel information of the previous TTI.

15. The receiver of claim 14, wherein the data channel information comprises at least one of a channel estimation value related to the data channel, a signal-to-noise ratio (SNR) and noise plus interference variance (NIV) estimation value, a Doppler estimation value, a delay spread estimation value, and an interference whitening (IW) filter.

16. The receiver of claim 11, wherein the communication interface is further configured to:
receive beamforming information about whether a beamforming characteristic applied to the previous TTI is same as a beamforming characteristic applied to the current TTI from the transmitter through radio resource control (RRC) signaling or downlink control information (DCI) transmission; and
provide the beamforming information to the controller, and
wherein the controller is further configured to:
determine whether to reuse the control channel information of the previous TTI based on the beamforming information received from the communication interface.

17. The receiver of claim 11, wherein the communication interface is further configured to:
receive beamforming information about whether a beamforming characteristic applied to the previous TTI is same as a beamforming characteristic applied to the current TTI is from the transmitter through radio resource control (RRC) signaling or downlink control information (DCI) transmission; and
provide the beamforming information to the controller, and
wherein the controller is further configured to request the transmitter to transmit a control channel demodulation reference signal (DMRS) mapped to resources throughout an entire band through the communication interface, and
wherein the control channel DMRS transmitted from the transmitter to the receiver is resource mapped throughout the entire band in response to a request to transmit the control channel DMRS.

18. The receiver of claim 17, wherein the controller is further configured to:
- check whether the beamforming characteristic applied to the previous TTI is same as the beamforming characteristic applied to the current TTI based on the beamforming information received from the communication interface; and
- determine whether to reuse the control channel information of the previous TTI after checking whether resource mapping of the control channel DMRS in the previous TTI is same as resource mapping of the control channel DMRS in the current TTI by checking whether the control channel DMRS of the previous TTI and the control channel DMRS of the current TTI are mapped to resources throughout the entire band received from the communication interface.

19. The receiver of claim 11, wherein the control channel information comprises at least one of a channel estimation value related to the control channel, a signal-to-noise ratio (SNR) and noise plus interference variance (NIV) estimation value, a Doppler estimation value, a delay spread estimation value, and an interference whitening (IW) filter.

20. The receiver of claim 11, wherein the communication interface comprises a radio frequency (RF) processing interface configured to convert an RF signal into a baseband signal and a baseband processing interface configured to process the baseband signal,
- wherein the RF processing interface comprises at least one of a phase locked loop (PLL), a voltage control oscillator (VCO), a low noise amplifier (LNA), a mixer, a local oscillator (LO), and an analog-to-digital converter (ADC), and
- wherein the baseband processing interface comprises at least one of an RX filter, an automatic gain controller (AGC), an automatic frequency controller (AFC), a timing synchronizer (TS), a channel estimator, a demodulator, and a decoder.

\* \* \* \* \*